United States Patent
Matsubara et al.

(10) Patent No.: US 12,045,033 B2
(45) Date of Patent: Jul. 23, 2024

(54) MACHINE LEARNING DEVICE AND ASSOCIATED METHODOLOGY FOR ADJUSTING PARAMETERS USED TO NUMERICALLY CONTROL A MACHINE TOOL

(71) Applicant: Mitsubishi Electric Corporation, Tokyo (JP)

(72) Inventors: Susumu Matsubara, Tokyo (JP); Kenji Iriguchi, Tokyo (JP); Hiroki Kaneko, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 343 days.

(21) Appl. No.: 17/279,095

(22) PCT Filed: Dec. 13, 2018

(86) PCT No.: PCT/JP2018/045871
§ 371 (c)(1),
(2) Date: Mar. 24, 2021

(87) PCT Pub. No.: WO2020/121477
PCT Pub. Date: Jun. 18, 2020

(65) Prior Publication Data
US 2021/0389753 A1     Dec. 16, 2021

(51) Int. Cl.
*G05B 19/4155*     (2006.01)
*G05B 19/4097*     (2006.01)

(52) U.S. Cl.
CPC ..... *G05B 19/4155* (2013.01); *G05B 19/4097* (2013.01); *G05B 2219/34082* (2013.01);
(Continued)

(58) Field of Classification Search
CPC ........... G05B 19/4155; G05B 19/4097; G05B 2219/34082; G05B 2219/35012; G05B 2219/36252; G05B 2219/35168
See application file for complete search history.

(56) References Cited

U.S. PATENT DOCUMENTS

| | | |
|---|---|---|
| 5,742,018 A | 4/1998 | Akemura |
| 2002/0082742 A1 | 6/2002 | Kadono |

(Continued)

FOREIGN PATENT DOCUMENTS

| | | |
|---|---|---|
| CN | 108687415 A | 10/2018 |
| JP | 61-173842 A | 8/1986 |

(Continued)

OTHER PUBLICATIONS

Office Action issued Aug. 15, 2022, in corresponding Chinese Patent Application No. 201880100064.5.
(Continued)

*Primary Examiner* — Kenneth M Lo
*Assistant Examiner* — Jonathan Michael Skrzycki
(74) *Attorney, Agent, or Firm* — XSENSUS LLP

(57) ABSTRACT

A machine learning device includes a data extraction unit that extracts first and second parameters from a plurality of machining programs. The machining programs numerically control a machine tool. The first parameter is a parameter to be adjusted, and the second parameter is a parameter used to adjust the first parameter. The machine learning device also includes a machine learning unit that learns a value of the first parameter according to a data set that includes the first and second parameters.

16 Claims, 20 Drawing Sheets

(52) U.S. Cl.
CPC ............. *G05B 2219/35012* (2013.01); *G05B 2219/36252* (2013.01)

(56) References Cited

U.S. PATENT DOCUMENTS

| | | |
|---|---|---|
| 2003/0187624 A1 | 10/2003 | Balic |
| 2005/0251284 A1 | 11/2005 | Balic |
| 2006/0190156 A1* | 8/2006 | Hidai ................. G05B 13/0265 701/58 |
| 2018/0067471 A1 | 3/2018 | Saitou et al. |
| 2018/0181108 A1* | 6/2018 | Nagano ................ G05B 19/182 |
| 2018/0181114 A1 | 6/2018 | Masakawa |
| 2018/0281091 A1* | 10/2018 | Nakashima ............ B23H 1/024 |
| 2018/0314227 A1* | 11/2018 | Bretschneider .... G05B 19/4097 |
| 2018/0341244 A1* | 11/2018 | Xu ............................ G06N 3/08 |
| 2018/0341246 A1* | 11/2018 | Coffman ................. G06F 30/27 |
| 2019/0018391 A1* | 1/2019 | Rogers ............... G05B 19/4097 |

FOREIGN PATENT DOCUMENTS

| | | |
|---|---|---|
| JP | 7-116927 A | 5/1995 |
| JP | 8-252746 A | 10/1996 |
| JP | 10-58280 A | 3/1998 |
| JP | 10-86039 A | 4/1998 |
| JP | 2001-142517 A | 5/2001 |
| JP | 2002-189510 A | 7/2002 |
| JP | 2008-155371 A | 7/2008 |
| JP | 2013-210926 A | 10/2013 |
| JP | 2018-41208 A | 3/2018 |
| JP | 2018-106379 A | 7/2018 |

OTHER PUBLICATIONS

Office Action issued on Jul. 22, 2022, in corresponding German patent Application No. 11 2018 008 126.5, 11 pages.
Monostori et al., "Machine Learning Approaches to Manufacturing", Annals of the CIRP, Manufacturing Technology, vol. 45, No. 2, 1996, pp. 675-712, total 39 pages, https://www.researchgate.net/publication/243779392.
Thorsten Wuest et al., "Machine learning in manufacturing: advantages, challenges, and applications", Production & Manufacturing Research: An Open Access Journal, 2016, vol. 4, No. 1, pp. 23-45, total 24 pages, online ISSN: 2169-3277, https://dx.doi.org/10.1080/21693277.2016.1192517.
Office Action issued on Dec. 29, 2021, in corresponding Chinese patent Application No. 201880100064.5, 15 pages.
International Search Report and Written Opinion mailed on Mar. 19, 2019, received for PCT Application PCT/JP2018/045871, Filed on Dec. 13, 2018, 9 pages including English Translation.
Decision to Grant mailed on Sep. 3, 2019, received for JP Application 2019-537394, 5 pages including English Translation.

* cited by examiner

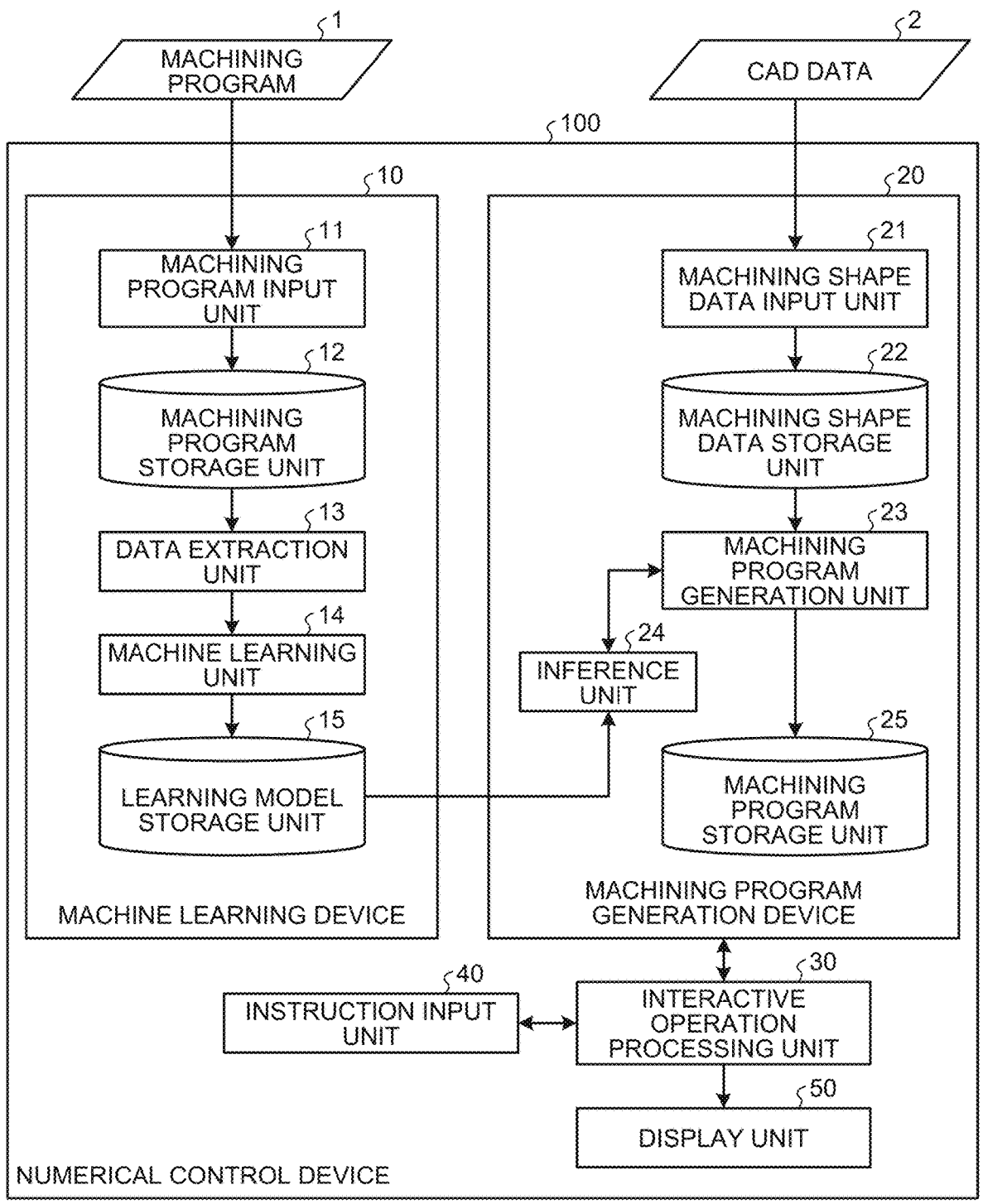

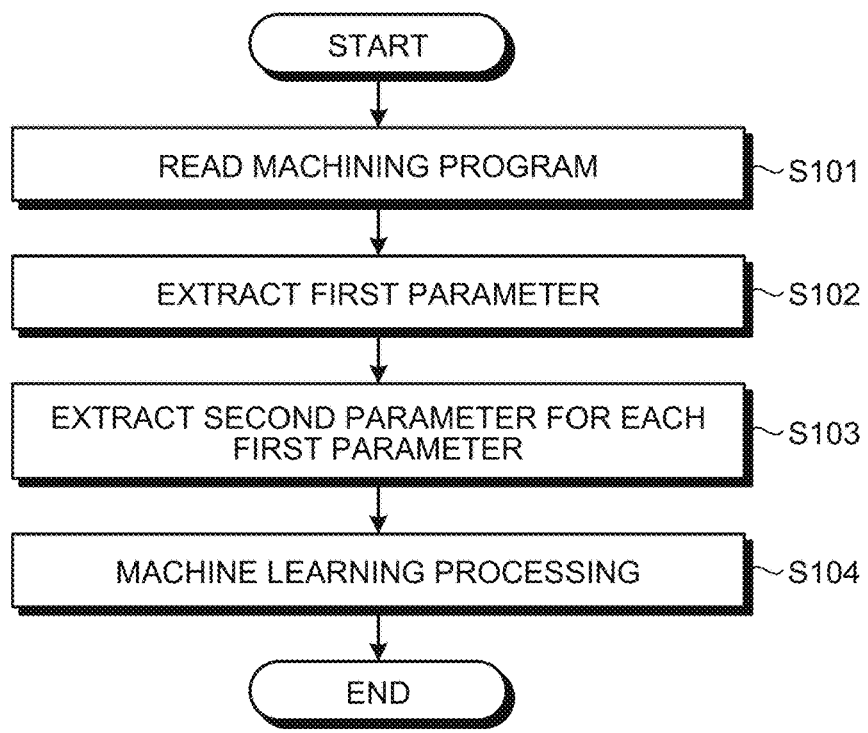
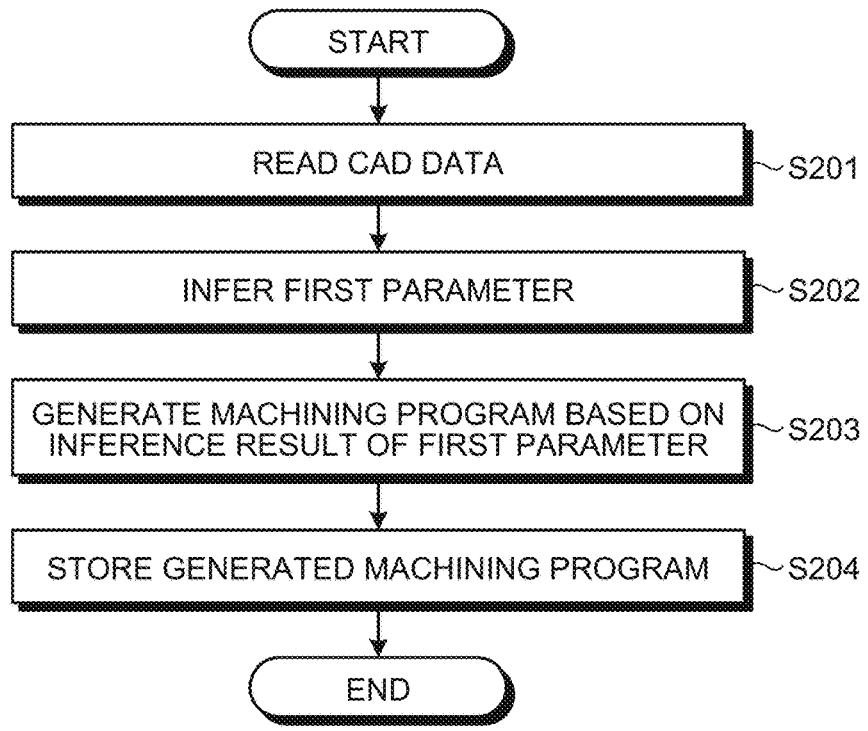

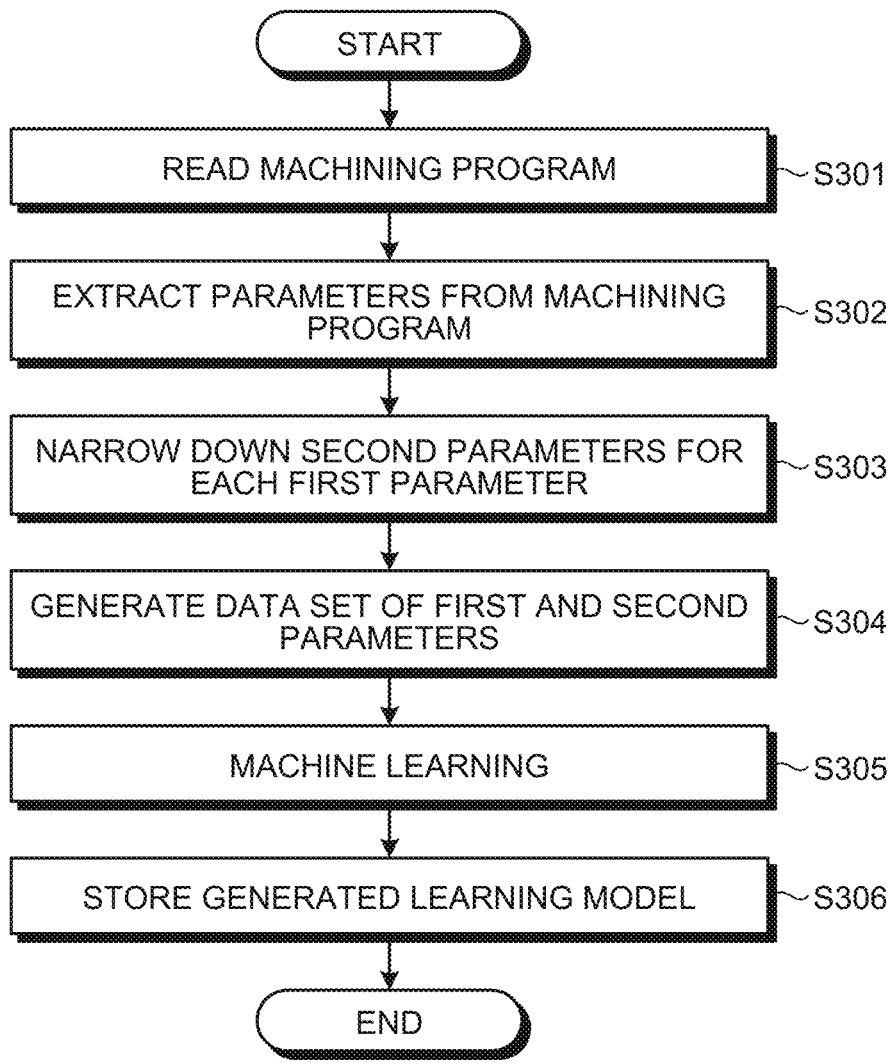

FIG.5

| M221A272 | | | | | | | – □ X |
|---|---|---|---|---|---|---|---|
| FILE | EDIT | VIEW | SETTINGS | | | | |

| UNo. | MATERIAL | OUTER DIAMETER | INNER DIAMETER | MATERIAL LENGTH | MATERIAL END FACE | ATC MODE | ROTATION SPEED | LOWER BLADE OUTER DIAMETER |
|---|---|---|---|---|---|---|---|---|
| 0 | FC250 | 438. | 352. | 530. | 30. | | 100 | |

| UNo. | UNIT | WORK No. | | | NUMBER OF TIMES | No. # | | |
|---|---|---|---|---|---|---|---|---|
| 1 | SUB-PROGRAM | 9000 | | | 1 | 1 | | |

| SNo. | ARGUMENT 1 | ARGUMENT 2 | ARGUMENT 3 | ARGUMENT 4 | ARGUMENT 5 | ARGUMENT 6 |
|---|---|---|---|---|---|---|
| 1 | C | -45. | | | | |

| UNo. | UNIT | WORK No. | | | NUMBER OF TIMES | No. # |
|---|---|---|---|---|---|---|
| 2 | SUB-PROGRAM | 1000 | | | 1 | 2 |

| SNo. | ARGUMENT 1 | ARGUMENT 2 | ARGUMENT 3 | ARGUMENT 4 | ARGUMENT 5 | ARGUMENT 6 |
|---|---|---|---|---|---|---|
| 1 | T | 5100. | | | | |

| UNo. | UNIT | MACHINING PART | ANGLE B | CUT-X | CUT-Z | FINISHING ALLOWANCE-X | FINISHING ALLOWANCE-Z |
|---|---|---|---|---|---|---|---|
| 3 | BAR | FRONT FACE | | 352. | -11.5 | 0.2 | 0.1 |

| SNo. | TOOL | NOMINAL | No. # | PATTERN | CUT 1 | CUT 2/PASS | CUT 3 | REMAINING ALLOWANCE-X | REMAINING ALLOWANCE-Z | PERIPHERAL SPEED | FEED | M | M | M |
|---|---|---|---|---|---|---|---|---|---|---|---|---|---|---|
| R 1 | TURN-ING | INNER DIAMETER | 51. | 3 | 0 | 1.5 | * | * | * | * | 150 | 0.3 | | | |

| FIG | PTN | FRONT CORNER | START POINT-X | START POINT-Z | END POINT-X | END POINT-Z | BACK CORNER/$ | R/θ | ROUGHNESS |
|---|---|---|---|---|---|---|---|---|---|
| 1 | LINE | | * | * | 438. | 0. | | * | |

| UNo. | UNIT | WORK No. | | | NUMBER OF TIMES | No. # |
|---|---|---|---|---|---|---|
| 4 | SUB-PROGRAM | 1000 | | | 1 | 4 |

| SNo. | ARGUMENT 1 | ARGUMENT 2 | ARGUMENT 3 | ARGUMENT 4 | ARGUMENT 5 | ARGUMENT 6 |
|---|---|---|---|---|---|---|
| 1 | T | 5400. | | | | |

| UNo. | UNIT | MACHINING PART | ANGLE B | CUT-X | CUT-Z | FINISHING ALLOWANCE-X | FINISHING ALLOWANCE-Z |
|---|---|---|---|---|---|---|---|
| 5 | BAR | INNER DIAMETER | | 355. | 0. | 0. | 0. |

| SNo. | TOOL | NOMINAL | No. # | PATTERN | CUT 1 | CUT 2/PASS | CUT 3 | REMAINING ALLOWANCE-X | REMAINING ALLOWANCE-Z | PERIPHERAL SPEED | FEED | M | M | M |
|---|---|---|---|---|---|---|---|---|---|---|---|---|---|---|
| R 1 | TURN-ING | INNER DIAMETER | 54. | 5 | 0 | 1.6 | * | * | * | * | 150 | 0.3 | | | |

| SNo. | ARGUMENT 1 | ARGUMENT 2 | ARGUMENT 3 | ARGUMENT 4 | ARGUMENT 5 | ARGUMENT 6 |
|---|---|---|---|---|---|---|
| 1 | T | 5800. | | | | |

| UNo. | UNIT | MODE | ANGLE B | POSITION C | NOMINAL | OUTER DIAMETER | PITCH | SCREW DEPTH | CHAMFER |
|---|---|---|---|---|---|---|---|---|---|
| 8 | TAP | XC | * | * | M16. | 16. | 2. | 29. | 0.9 |

| SNo. | TOOL | NOMINAL DIAMETER | No. # | DRILLED HOLE DIAMETER | DRILLED HOLE H | PILOT HOLE DIAMETER | PILOT HOLE H | ROUGH-NESS | CUT | PERIPHERAL SPEED | FEED | M | M | M |
|---|---|---|---|---|---|---|---|---|---|---|---|---|---|---|
| 1 | SPOT | 25. | 7 | 17. | * | * | * | 90° | SPOT | 30 | 0.15 | 45 | | |
| 2 | DRILL | 14. | 8 | 14. | 42.7 | 0. | 100 | DEEP HOLE | T 7.1 | 60 | 0.22 | 45 | | |
| 3 | TAP | M16. | 9 | 16. | 28.4 | TAP | * | FIXED | P2. | 8 | 2. | 420 | | |

| FIG | PTN | START POINT-R/x | START POINT-C/y | START POINT-Z | | NUMBER | ANGLE | Q | R |
|---|---|---|---|---|---|---|---|---|---|
| 1 | ARC | 202.5 | 45. | 0. | | 2 | 90. | 0 | 0 |

| UNo. | UNIT | MODE | ANGLE B | POSITION C | NOMINAL | OUTER DIAMETER | PITCH | SCREW DEPTH | CHAMFER |
|---|---|---|---|---|---|---|---|---|---|
| 9 | TAP | XC | * | * | M16. | 16. | 2. | 45. | 0.9 |

| SNo. | TOOL | NOMINAL DIAMETER | No. # | DRILLED HOLE DIAMETER | DRILLED HOLE H | PILOT HOLE DIAMETER | PILOT HOLE H | ROUGH-NESS | CUT | PERIPHERAL SPEED | FEED | M | M | M |
|---|---|---|---|---|---|---|---|---|---|---|---|---|---|---|
| 1 | SPOT | 25. | 7 | 17. | * | * | * | 90° | SPOT | 30 | 0.15 | 45 | | |
| 2 | DRILL | 14. | 8 | 14. | 48. | 0. | 100 | DEEP HOLE | T 7.1 | 60 | 0.22 | 45 | | |
| 3 | TAP | M16. | 9 | 16. | 45. | TAP | * | FIXED | P2. | 8 | 2. | 420 | | |

| FIG | PTN | START POINT-R/x | START POINT-C/y | START POINT-Z | | NUMBER | ANGLE | Q | R |
|---|---|---|---|---|---|---|---|---|---|
| 1 | ARC | 202.5 | 225. | 0. | | 2 | 90. | 0 | 0 |

| UNo. | UNIT | WORK No. | | | NUMBER OF TIMES | No. # |
|---|---|---|---|---|---|---|
| 10 | SUB-PROGRAM | 1000 | | | 1 | 10 |

| SNo. | ARGUMENT 1 | ARGUMENT 2 | ARGUMENT 3 | ARGUMENT 4 | ARGUMENT 5 | ARGUMENT 6 |
|---|---|---|---|---|---|---|
| 1 | T | 5500. | | | | |

| UNo. | UNIT | No. # | M1 | M2 | M3 | M4 | M5 | M6 | M7 | M8 | M9 | M10 | M11 | M12 |
|---|---|---|---|---|---|---|---|---|---|---|---|---|---|---|
| 11 | M CODE | 11 | 421 | | | | 0 | | | | | | | |

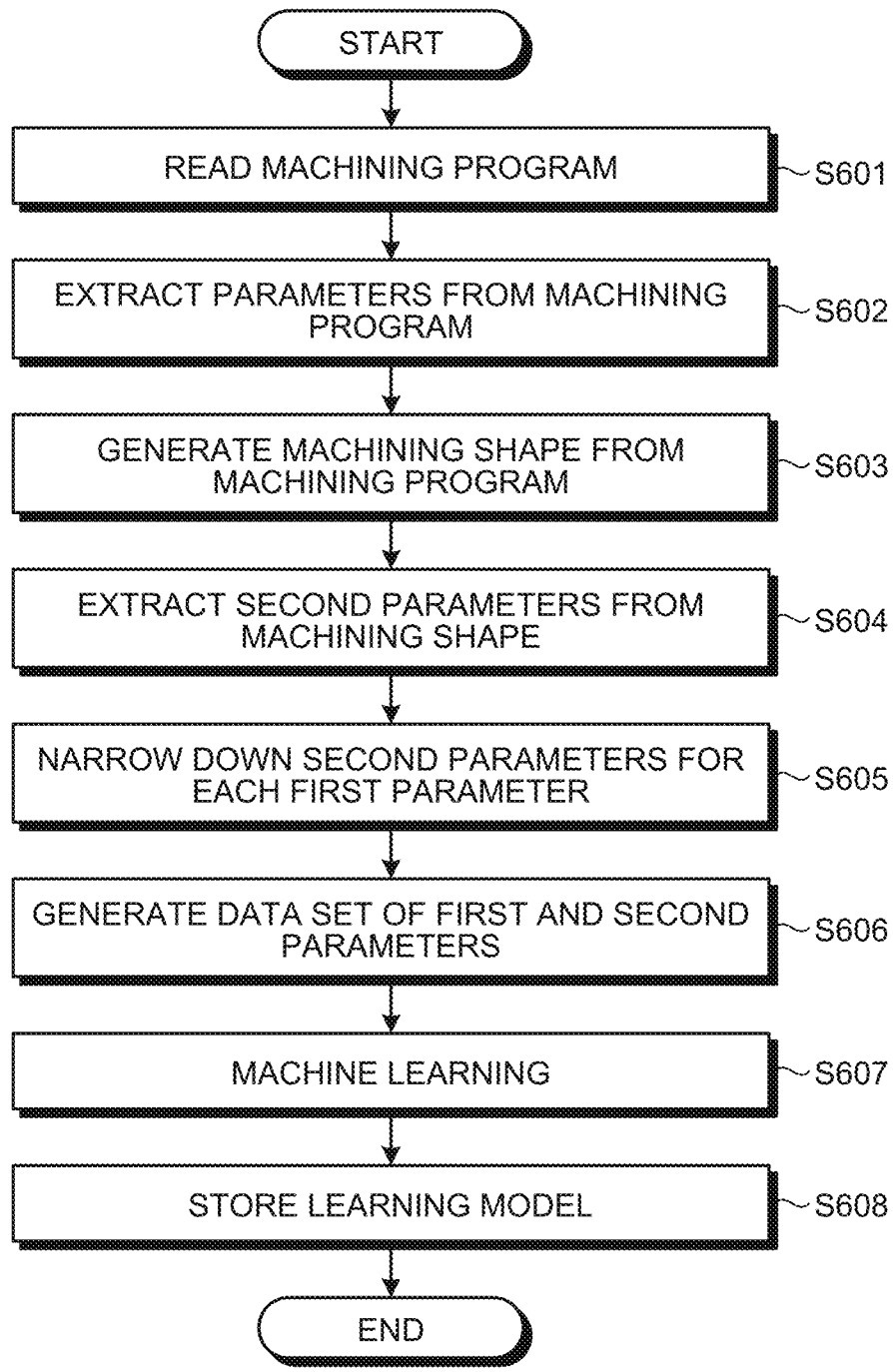

FIG. 21

| Smooth/ | 100-DEMO-4C/ | IMTSsample_INTEI-TOOLPATHTEST/ | inch | | | | | |
|---|---|---|---|---|---|---|---|---|
| UNo. | MATERIAL | OUTER DIAMETER | INNER DIAMETER | MATERIAL END FACE | MATERIAL LENGTH | ATC MODE | ROTATION SPEED | LOWER BLADE OUTER DIAMETER |
| 0 | CST IRN | 6. | 1.5 | 0. | 7. | 0 | 1500. | 6. |

| UNo. | UNIT | ADDITIONAL FRM | X | Y | Z | θ | C | |
|---|---|---|---|---|---|---|---|---|
| 1 | FRM- | 0 | CENTER TURNING | CENTER TURNING | 0. | 0. | 0. | |

| UNo. | UNIT | PATTERN | HEAD | SPINDLE | | | | |
|---|---|---|---|---|---|---|---|---|
| 2 | HEAD SELECTION | INDEPENDENT | 1 | * | | | | |

| UNo. | UNIT | TURN POSITION X | TURN POSITION Y | TURN POSITION Z | ANGLE B | ANGLE C | | |
|---|---|---|---|---|---|---|---|---|
| 3 | INDEX | 0. | 0. | 0. | 90. | 0. | | |

| UNo. | UNIT | MACHINING PART | CUT-X | CUT-Z | FINISHING ALLOWANCE-X | FINISHING ALLOWANCE-Z | | |
|---|---|---|---|---|---|---|---|---|
| 4 | BAR | OUTER DIAMETER | 6. | 0. | 0.1 | 0.1 | | |

| SNo. | TOOL | NOMINAL | No. | # | PATTERN | CUT 1 | CUT 2/PASS | CUT 3 | REMAINING ALLOWANCE-X | REMAINING ALLOWANCE-Z | PERIPHERAL SPEED | FEED | M | M | M |
|---|---|---|---|---|---|---|---|---|---|---|---|---|---|---|---|
| R1 | TURNING | OUTER DIAMETER | 1. | A | 0 | 0.3 | * | * | * | * | 100. | 1. | | | |
| F2 | TURNING | OUTER DIAMETER | 1. | B | | | | | 0. | 0. | 100. | 1. | | | |

| FIG | PTN | FRONT CORNER | START POINT-X | START POINT-Z | END POINT-X | END POINT-Z | BACK CORNER$ | R/θ | ROUGHNESS |
|---|---|---|---|---|---|---|---|---|---|
| 1 | TAPER | | 3. | 0. | 5.27176 | 1.9674 | * | * | |
| 2 | TAPER | | 5.27176 | 1.9674 | 5.27176 | 2.9674 | | | |

| UNo. | UNIT | TURN POSITION X | TURN POSITION Y | TURN POSITION Z | ANGLE B | ANGLE C | | |
|---|---|---|---|---|---|---|---|---|
| 5 | INDEX | 0. | 0. | 0. | 0. | 0. | | |

| UNo. | UNIT | HOLE DIAMETER | HOLE DEPTH | CHAMFER | | | | |
|---|---|---|---|---|---|---|---|---|
| 6 | DRILL | 0.5156 | 0.5 | 0. | | | | |

| SNo. | TOOL | NOMINAL DIAMETER | No. | # | DRILLED HOLE DIAMETER | DRILLED HOLE H | PILOT HOLE DIAMETER | PILOT HOLE H | ROUGHNESS | CUT | CUT-P | PERIPHERAL SPEED | FEED | M | M | M |
|---|---|---|---|---|---|---|---|---|---|---|---|---|---|---|---|---|
| 1 | DRILL | 0.52 | | | 0.52 | 0.5 | 0. | 100 | DRILL | T 0.26 | * | 100. | 1. | | | |

| FIG | PTN | X | Y | Z | AN1 | AN2 | T1 | T2 | F | M | N | P | Q | R |
|---|---|---|---|---|---|---|---|---|---|---|---|---|---|---|
| 1 | CIRCLE | 0. | 0. | 0. | 0.008 | * | 1.08307 | * | * | 4 | * | * | * | 0 |

| UNo. | UNIT | CONTINUE | NUMBER OF TIMES | SHIFT AMOUNT | COUNT | ATC | RETURN | LOWER BLADE RETURN | WORK No. | EXECUTE |
|---|---|---|---|---|---|---|---|---|---|---|
| 7 | END | | * | * | | | | | | * |

MACHINE LEARNING DEVICE AND ASSOCIATED METHODOLOGY FOR ADJUSTING PARAMETERS USED TO NUMERICALLY CONTROL A MACHINE TOOL

CROSS-REFERENCE TO RELATED APPLICATION

The present application is based on PCT filing PCT/JP2018/045871, filed Dec. 13, 2018, the entire contents of which are incorporated herein by reference.

FIELD

The present invention relates to a machine learning device, a machining program generation device, and a machine learning method that are used for automatically creating a machining program for numerically controlling a machine tool.

BACKGROUND

In recent years, in the field of machine tools that are controlled by numerical control devices, machine tool structures have become complicated and the number of machine tool axes to be controlled has increased so that complicated shapes can be precisely created, and accordingly the number of processes to be numerically controlled has increased (for example, see Patent Literature 1). For this reason, machining programs have also become complicated.

CITATION LIST

Patent Literature

Patent Literature 1: Japanese Patent Application Laid-open No. 2013-210926

SUMMARY

Technical Problem

Due to the above-described complexity of machining programs, a wide variety of parameters must be adjusted for generating a machining program, and it takes time and effort to generate a machining program.

The present invention has been made in view of the above, and an object thereof is to obtain a machine learning device that facilitates generation of a machining program for numerically controlling a machine tool.

Solution to Problem

A machine learning device according to an aspect of the present invention includes: a data extraction unit to extract a first parameter and a second parameter from each of a plurality of machining programs for numerically controlling a machine tool, the first parameter being a parameter to be adjusted, the second parameter being a parameter to be used for adjusting the parameter to be adjusted; and a machine learning unit to learn a value of the first parameter according to a data set including the first parameter and the second parameter extracted by the data extraction unit.

Advantageous Effects of Invention

The machine learning device according to the present invention can achieve the effect of facilitating generation of a machining program for numerically controlling a machine tool.

BRIEF DESCRIPTION OF DRAWINGS

FIG. 1 is a block diagram illustrating an exemplary configuration of a numerical control device including a machine learning device and a machining program generation device according to a first embodiment of the present invention.

FIG. 2 is a flowchart illustrating a procedure for learning model generation processing by the machine learning device illustrated in FIG. 1.

FIG. 3 is a flowchart illustrating a procedure for machining program generation processing by the machining program generation device illustrated in FIG. 1.

FIG. 4 is a flowchart illustrating details of learning model generation processing by the machine learning device illustrated in FIG. 1.

FIG. 5 is a diagram illustrating an example of a machining program that is read by the machine learning device illustrated in FIG. 1.

FIG. 20 is a flowchart illustrating details of the learning model generation processing illustrated in FIG. 19.

FIG. 21 is a diagram illustrating an example of a machining program that is read by the machine learning device in the second embodiment.

DESCRIPTION OF EMBODIMENTS

Figure 6:
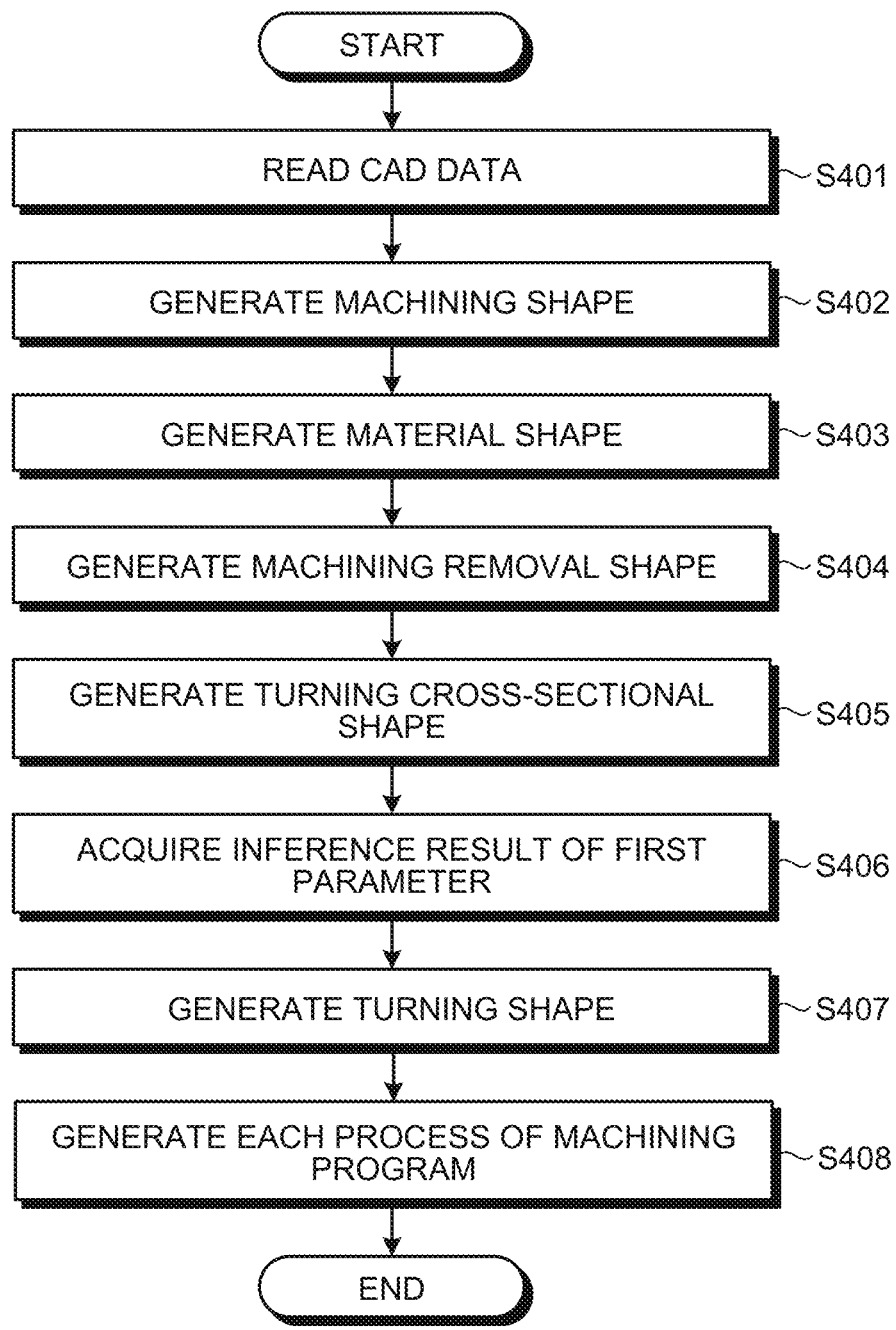
FIG. 6 is a flowchart illustrating details of machining program generation processing by a machining program generation unit illustrated in FIG. 1.

Hereinafter, a machine learning device, a machining program generation device, and a machine learning method according to the first and second embodiments of the present invention will be described in detail with reference to the drawings. The present invention is not limited to the embodiments.

First Embodiment

FIG. 1 is a block diagram illustrating an exemplary configuration of a numerical control device 100 including a machine learning device 10 and a machining program generation device 20 according to the first embodiment of the present invention.

The numerical control device 100 includes the machine learning device 10, the machining program generation device 20, an interactive operation processing unit 30, an instruction input unit 40, and a display unit 50. The numerical control device 100 is installed on or connected to a machine tool (not illustrated) to numerically control the operation of the machine tool according to a machining program. Here, the machining program is used for cutting a material workpiece to carve out the design shape.

In the example illustrated in FIG. 1, the machine learning device 10 and the machining program generation device 20 are installed on the numerical control device 100, but the present embodiment is not limited to this example. For example, the machine learning device 10 and the machining program generation device 20 may be devices different from the numerical control device 100. In addition, the machine learning device 10 may be a device different from the machining program generation device 20.

The machine learning device 10 generates, based on a plurality of machining programs 1 created in the past, a learning model that is used when the machining program generation device 20 generates a machining program. That is, the machining programs 1 that are input to the machine learning device 10 are machining programs for learning, and a machining program that is generated by the machining program generation device 20 is a new machining program that is created for numerically controlling the machine tool.

The machining program generation device 20 generates a machining program based on machining shape data indicating a design shape such as computer-aided design (CAD) data 2 input to the machining program generation device 20 from outside the numerical control device 100. For generating a machining program, the machining program generation device 20 uses a learning model that is a learning result of the machine learning device 10.

The interactive operation processing unit 30 is not only an interface between the numerical control device 100 and the operator, but also an interface between the machine learning device 10 or the machining program generation device 20 and the operator. The interactive operation processing unit 30 transmits the instruction information input by the operator via the instruction input unit 40 to the machine learning device 10 or the machining program generation device 20. The interactive operation processing unit 30 also displays the instruction information input by the operator via the instruction input unit 40 on the display unit 50.

The instruction input unit 40 includes input devices such as a mouse and a keyboard, accepts instruction information from the operator, and transmits the instruction information to the interactive operation processing unit 30.

The display unit 50 is a display device such as a liquid crystal monitor, and displays the machining programs 1, the CAD data 2, the instruction information input by the operator via the instruction input unit 40, and the like. The display unit 50 can also display various information related to processing that is performed by the numerical control device 100, the machine learning device 10, and the machining program generation device 20.

The machine learning device 10 includes a machining program input unit 11, a machining program storage unit 12, a data extraction unit 13, a machine learning unit 14, and a learning model storage unit 15.

The machining program input unit 11 accepts the data of the machining programs 1 input to the machine learning device 10 from a device external to the numerical control device 100, and inputs the data to the machining program storage unit 12. The machining programs 1 are computer programs for numerically controlling the machine tool (not illustrated), and include machining methods, tools, cutting conditions, tool trajectories, material shapes, material property information, and the like. The machining program storage unit 12 stores the machining programs 1 input from the machining program input unit 11.

The data extraction unit 13 extracts a first parameter and a second parameter from each of a plurality of machining programs 1, the first parameter being a parameter to be adjusted that is used in the machining program 1, the second parameter being a non-adjustable parameter that is used in the machining program 1. First parameters are parameters that need to be determined for generating the machining program 1, and include, for example, machining method, machining order, tool type, feed, cutting speed, radial amount of cut, axial amount of cut, and the like. Second parameters are non-adjustable parameters that are used for adjusting first parameters. Second parameters include, for example, parameters whose values are determined based on material shape, material property, machining shape, and the like, or parameters that have already been adjusted. For each type of first parameter, the type of second parameter that is used for adjusting the first parameter is determined. That is, first parameters are adjusted based on second parameters.

The data extraction unit 13 determines the type of second parameter to be extracted for each type of first parameter, and extracts the second parameter of the determined type. The data extraction unit 13 inputs, for each machining program 1, the extracted first and second parameters to the machine learning unit 14.

The machine learning unit 14 performs supervised learning based on the first and second parameters extracted by the data extraction unit 13, and generates a model that estimates results from inputs, that is, a learning model indicating the relationship between the first and second parameters. Specifically, the machine learning unit 14 learns first parameter values according to a data set including the first and second parameters extracted by the data extraction unit 13. The machine learning unit 14 stores the generated learning model in the learning model storage unit 15.

The machine learning unit 14 may use any learning algorithm. An example thereof is an algorithm such as a neural network or SVM. The neural network may be multi-layered deep learning. Alternatively, the learning algorithm that is used by the machine learning unit 14 may be genetic programming, functional logic programming, a support vector machine, or the like. Machine learning is a process of optimizing parameters such as neural network weights and biases.

The learning model storage unit 15 stores a learning model that is a learning result of the machine learning unit 14. The learning model indicates the optimal relationship of the first parameter to input second parameters.

The machining program generation device 20 includes a machining shape data input unit 21, a machining shape data storage unit 22, a machining program generation unit 23, an inference unit 24, and a machining program storage unit 25.

The machining shape data input unit 21 accepts machining shape data such as the CAD data 2 from a device external to the numerical control device 100, and stores the accepted machining shape data in the machining shape data storage unit 22. The machining shape data include a design shape, i.e. the shape of a finished article, and information indicating the property of the material. The material is a workpiece from which the design shape represented by the CAD data 2 is carved out. The machining shape data are not limited to the CAD data 2, and may be any data that can be interpreted by the machining program generation device 20.

The machining shape data storage unit 22 stores the machining shape data accepted by the machining shape data input unit 21.

The machining program generation unit 23 generates a machining program for carving out the design shape indicated by the CAD data 2 from the material. The machining program generation unit 23 stores the generated machining program in the machining program storage unit 25. In response to acquiring machining shape data from the machining shape data storage unit 22, the machining program generation unit 23 generates, based on the acquired machining shape data, input data that are input to a learning model by the inference unit 24. The machining program generation unit 23 causes the inference unit 24 to infer, using the generated input data, the value of a first parameter for use in the machining program to be generated, and acquires the inference result. The machining program generation unit 23 generates input data for each of the plurality of first parameters that are used for generating a machining program, indicates the type of first parameter, passes the input data, and instructs the inference unit 24 to infer the first parameter. The machining program generation unit 23 acquires the inference result generated by the inference unit 24 in response to the instruction. The machining program generation unit 23 generates a machining program based on the value of the first parameter inferred by the inference unit 24. The machining program generation unit 23 stores the generated machining program in the machining program storage unit 25.

The inference unit 24 receives input data and an indication of the type of first parameter from the machining program generation unit 23, and uses the received input data and the learning model stored in the learning model storage unit 15 to infer the value of the indicated first parameter. The inference unit 24 returns the inference result of the first parameter to the machining program generation unit 23.

The machining program storage unit 25 stores the machining program generated by the machining program generation unit 23.

Hereinafter, the operation of the numerical control device 100 will be described. The operation of the numerical control device 100 includes learning model generation processing that is performed by the machine learning device 10 and machining program generation processing that is performed by the machining program generation device 20.

FIG. 2 is a flowchart illustrating a procedure for learning model generation processing by the machine learning device 10 illustrated in FIG. 1. In the learning model generation processing, a learning model for generating a machining program is generated based on the machining programs 1.

First, the machining program input unit 11 reads a plurality of machining programs 1 from a storage area (not illustrated), and stores the plurality of machining programs 1 in the machining program storage unit 12 (step S101). Next, the data extraction unit 13 extracts first parameters from the machining programs 1 stored in the machining program storage unit 12 (step S102). The data extraction unit 13 further extracts a second parameter for each of the plurality of first parameters extracted (step S103). At this time, the data extraction unit 13 can determine the type of second parameter to be extracted for each type of first parameter, and extract the second parameter of the determined type. Steps S102 and S103 are performed for each machining program, and the data extraction unit 13 inputs, for each machining program, the extracted first and second parameters to the machine learning unit 14.

The machine learning unit 14 performs machine learning processing using the first and second parameters input from the data extraction unit 13 (step S104). The machine learning unit 14 generates a data set based on the first and second parameters, and performs machine learning according to the generated data set. The data set is a set of data in which a first parameter to be adjusted is associated with a second parameter, i.e. a non-adjustable parameter that is used for determining the value of the first parameter. The machine learning unit 14 generates an optimized model as a learning model using a predetermined standard. The machine learning unit 14 generates a learning model that is a learning result, and stores the generated learning model in the learning model storage unit 15.

FIG. 3 is a flowchart illustrating a procedure for machining program generation processing by the machining program generation device 20 illustrated in FIG. 1. The machining program generation device 20 infers machining program parameters using the learning result of the machine learning device 10, and generates a machining program using the inference result.

The machining shape data input unit 21 reads the CAD data 2 from a storage area (not illustrated), and stores the read CAD data 2 in the machining shape data storage unit 22 (step S201). From the machining shape data, the machining program generation unit 23 acquires a second parameter that is used for inferring a first parameter, and the inference unit 24 infers a first parameter using the second parameter acquired by the machining program generation unit 23 and the learning model generated by the machine learning device 10 (step S202).

The machining program generation unit 23 generates a machining program based on the inference result of the first parameter (step S203). The machining program generation unit 23 stores the generated machining program in the machining program storage unit 25 (step S204).

Next, learning model generation processing by the machine learning device 10 will be described in detail. FIG. 4 is a flowchart illustrating details of learning model generation processing by the machine learning device 10 illustrated in FIG. 1. Here, the operation illustrated in FIG. 4 will be described using the machining program illustrated in FIG. 5. FIG. 5 is a diagram illustrating an example of a machining program that is read by the machine learning device 10 illustrated in FIG. 1.

The machining program illustrated in FIG. 5 is a numerical control program for tap machining, and includes a plurality of parameter names and their values. Returning to FIG. 4, the machining program input unit 11 reads a plurality of machining programs 1 from a storage area (not illustrated), and stores the read machining programs 1 in the machining program storage unit 12 (step S301).

The data extraction unit 13 extracts parameters from each of the plurality of machining programs 1 stored in the machining program storage unit 12 (step S302).

Examples of parameters that are extracted from the machining program illustrated in FIG. 5 include parameters related to materials, parameters related to machining, parameters related to tools, and parameters related to machining positions. The parameters related to materials are the material property "FC250", the material outer diameter "438", the material inner diameter "352", the material length "530", the material end face "30", and the material rotation speed "100". The parameters related to machining are the unit number "9", the machining type "tap machining", the machining mode "XC", the tap nominal "M16", the outer diameter "16", the pitch "2", the screw depth "45", and the chamfer "0.9". The parameters related to tools are the tool sequence number "2", the tool type "drill", the nominal diameter "14", the tool No. "8", the drilled hole diameter "14", the drilled hole depth "42.7", the pilot hole diameter "0", the pilot hole depth "100", the drilling method "deep hole drilling", the depth of cut per pass "7.1", the peripheral speed "60", the feed "0.22", and the M code "M45". The parameters related to machining positions are the shape pattern "arc", the start point position coordinate x "202.5", the start point position coordinate y "225", the start point position coordinate z "0", the number "2", and the angle "90".

Returning to FIG. 4, among the extracted parameters, the data extraction unit 13 narrows down the non-adjustable second parameters for each of the first parameters to be adjusted (step S303).

In the example illustrated in FIG. 5, in a case where "drilling method" is a first parameter, the value of the drilling method is one of four values from 0 to 3, where "0" represents drill cycle, "1" represents high-speed deep hole cycle, "2" represents deep hole cycle, and "3" represents ultra-deep hole cycle. In this case, the second parameters narrowed down based on the type of first parameter are the material property "FC250", the material outer diameter "438", the material inner diameter "352", the material length "530", the material end face "30", the machining type "tap machining", the drilled hole diameter "14", and the drilled hole depth "42.7".

In a case where the machining order of drill turning and end face turning is a first parameter, the value of the machining order is either of two values, 0 or 1, where "0" represents drill turning→end face turning and "1" represents end face turning→drill turning. In this case, the second parameters narrowed down based on the type of first parameter can be material property, material outer diameter, material inner diameter, material length, material end face, drilled hole diameter, and drilled hole depth.

In a case where machining site is a first parameter, the value of the machining site is one of four values from 0 to 3, where "0" represents outer diameter, "1" represents inner diameter, "2" represents front face, and "3" represents back face. In this case, the second parameters narrowed down based on the type of first parameter can be material property, material outer diameter, material inner diameter, radial allowance, and axial allowance.

In a case where machining method is a first parameter, the value of the machining method is either of two values, 0 or 1, where "0" represents bar turning and "1" represents groove turning. In this case, the second parameters narrowed down based on the type of first parameter can be material property, material outer diameter, material inner diameter, radial allowance, and axial allowance.

Note that a method of extracting parameters involves selecting features effective for machine learning from the parameters obtained from input patterns, and can be round-robin, forward sequential feature selection, backward sequential feature selection, or the like. Another method of extracting parameters is based on machine learning and involves setting an evaluation function and updating feature conversion parameters. A technique called "Lasso", in which the L1 norm of a parameter is added to the evaluation function as a regularization term, enables sparse feature conversion in which the values of many parameters become zero. Furthermore, a technique called "Group Lasso" has been proposed, in which some parameters are grouped and Lasso is performed thereon so that the value of each group becomes zero. Still another method of extracting parameters is based on the experience of the operator.

First parameters may include not only "drilling method", "machining order of drill turning and end face turning", "machining site", and "bar turning and groove turning", but also any parameters to be adjusted that are items related to machining program generation. For example, first parameters can be "rotation speed of turning material", "turning tool nominal", "cut-X", "cut-Z", "peripheral speed", "feed", "remaining allowance-X", "remaining allowance-Z", and the like. Not only items related to turning and hole drilling but also all items related to machining programs such as line machining, surface machining, head selection, and workpiece movement can be used as first parameters. First parameters are not limited to integer values, but may be real values if linear regression is used.

Returning to FIG. 4, the data extraction unit 13 uses the first parameters and the second parameters narrowed down based on the type of first parameter to generate a data set including the first and second parameters, and inputs the generated data set to the machine learning unit 14 (step S304).

The machine learning unit 14 performs machine learning according to the data set input from the data extraction unit 13, and generates, for each first parameter, a learning model indicating the relationship between the first and second parameters (step S305). The machine learning unit 14 stores the generated learning model in the learning model storage unit 15 (step S306).

Next, machining program generation processing by the machining program generation device 20 will be described in detail. FIG. 6 is a flowchart illustrating details of machining program generation processing by the machining program generation unit 23 illustrated in FIG. 1. The following example of machining program generation processing relates to turning in which the material is carved while being rotated.

Figure 7:
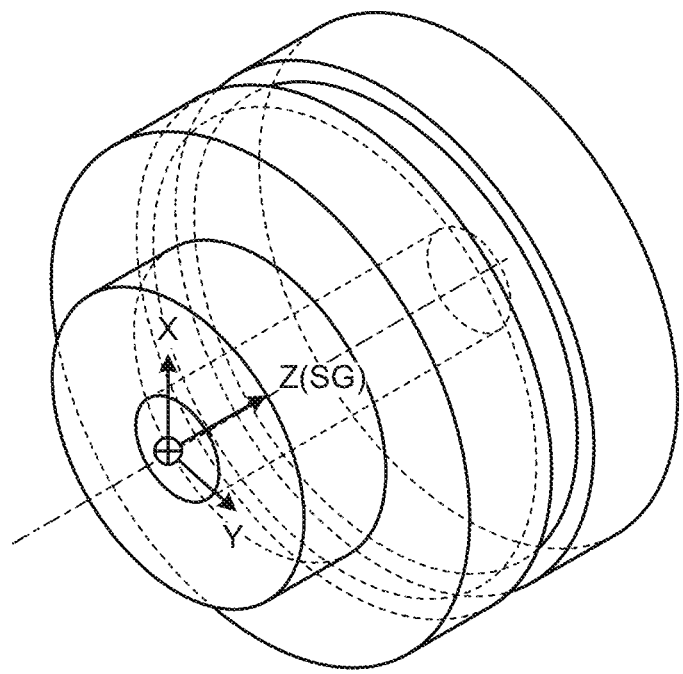
FIG. 7 is a perspective view illustrating a machining shape that is a finished workpiece shape indicated by CAD data illustrated in FIG. 1.

First, the machining program generation unit 23 reads the CAD data 2 that are the machining shape data stored in the machining shape data storage unit 22 (step S401). The CAD data 2 are design data including an original workpiece shape and a finished workpiece shape. FIG. 7 is a perspective view illustrating a machining shape that is a finished workpiece shape indicated by the CAD data 2 illustrated in FIG. 1.

Returning to FIG. 6, the machining program generation unit 23 generates the machining shape illustrated in FIG. 7 based on the read CAD data 2, and arranges the machining shape at the program origin, i.e. the machining origin of the program coordinate system (step S402).

In the program coordinate system, the Z axis of the X, Y, and Z axes is set as a turning axis SG, i.e. the central axis for turning. When arranging the machining shape at the program origin, the machining program generation unit 23 moves and rotates the machining shape such that the rotation axis of the cylindrical surface or conical surface having the largest diameter coincides with the Z axis. In addition, the end face of the machining shape in the Z-axis direction is moved to coincide with the program origin. That is, the machining program generation unit 23 extracts, as a cutting end face from the CAD data 2, a cylindrical surface or a conical surface whose rotation center axis is the same as the turning axis SG. Therefore, the machining program generation unit 23 generates, from the CAD data 2, a three-dimensional machining shape whose rotation center axis is the turning axis.

Figure 8:
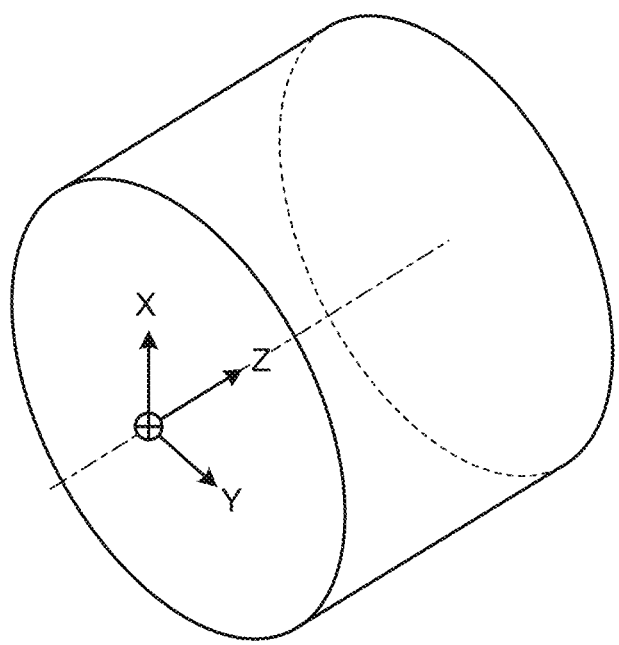
FIG. 8 is a perspective view illustrating a material shape that is generated based on the CAD data illustrated in FIG. 1.

Returning to FIG. 6, the machining program generation unit 23 then generates a three-dimensional material shape based on the read CAD data 2 (step S403). Specifically, the machining program generation unit 23 generates a three-dimensional cylindrical shape that encompasses the machining shape arranged at the program origin, and arranges the three-dimensional cylindrical shape in the program coordinate system in the same manner as when arranging the machining shape. FIG. 8 is a perspective view illustrating a material shape that is generated based on the CAD data 2 illustrated in FIG. 1. The material shape is the original workpiece shape. The dimensions of the material shape can be found from the maximum and minimum values of the machining shape in each of the X-, Y-, and Z-axis directions. However, because end face turning is performed, the material shape should be about 2 mm to 3 mm larger in the Z-axis direction than the machining shape according to the machining shape. In addition, the end face of the material shape in the Z-axis direction is arranged at a position separate from the program origin by 2 mm to 3 mm in the direction away from the machining shape. Here, the material shape has a material outer diameter of 150 mm, a material length of 120 mm, and a material property of S45C.

Figure 9:
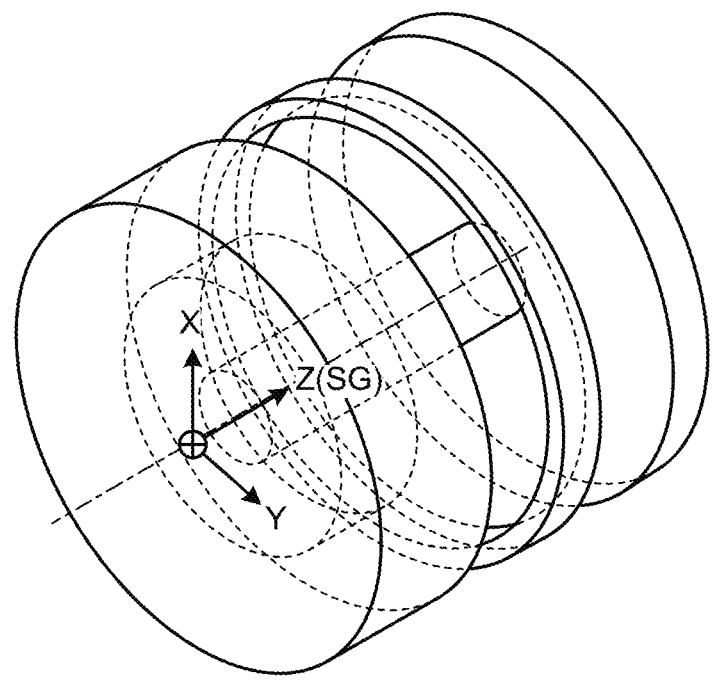
FIG. 9 is a perspective view illustrating a machining removal shape that is generated by the machining program generation unit illustrated in FIG. 1.

Based on the material shape and the machining shape, the machining program generation unit 23 generates a machining removal shape that is the shape to be removed through turning from the material shape (step S404). FIG. 9 is a perspective view illustrating a machining removal shape that is generated by the machining program generation unit 23 illustrated in FIG. 1. In FIG. 9, the machining shape is represented by broken lines. The machining removal shape can be found by means of a difference calculation in which the solid model of the machining shape is subtracted from the solid model of the material shape.

Figure 10:
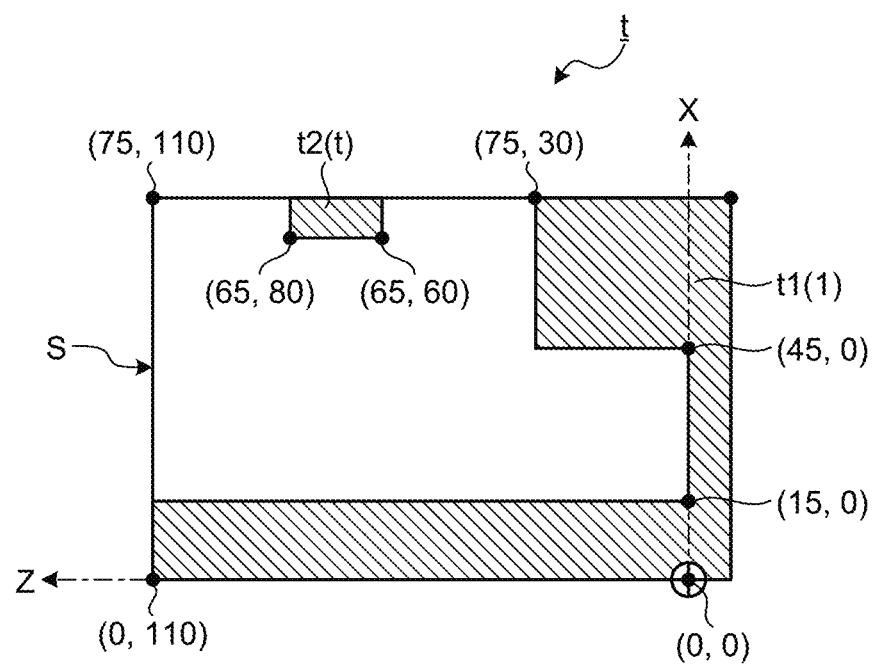
FIG. 10 is a diagram illustrating a turning cross-sectional shape that is a cross-sectional shape of the machining removal shape illustrated in FIG. 9.

Next, the machining program generation unit 23 generates a turning cross-sectional shape t that is a cross-sectional shape of the machining removal shape (step S405). FIG. 10 is a diagram illustrating the turning cross-sectional shape t that is a cross-sectional shape of the machining removal shape illustrated in FIG. 9. The turning cross-sectional shape illustrated in FIG. 10 is a ½ turning cross-sectional shape obtained by projecting the machining removal shape onto a +XZ plane, i.e. +X region of the XZ plane. The machining program generation unit 23 can find the turning cross-sectional shape by finding a cross-sectional shape by multiplying the cross-sectional model on the XZ plane and the solid model consisting of the machining shape, and limiting the range to a region where X is not less than zero. FIG. 10 illustrates the turning cross-sectional shape t including a turning cross-sectional shape t1 and a turning cross-sectional shape t2.

Returning to FIG. 6, the machining program generation unit 23 provides, to the inference unit 24, an indication of the type of first parameter to be inferred and an input of second parameters, and acquires the inference result of the first parameter (step S406). For example, the machining program generation unit 23 inputs, to the inference unit 24, the second parameters of the material property "S45C", the material length "120 mm", the material outer diameter "150 mm", the material inner diameter "0 mm", the material end face "10 mm", the hole diameter "30 mm", and the hole depth "10 mm", and acquires the first parameter "0" as the inference result from the inference unit 24. Here, the first parameter "0" indicates that a drill turning process is performed first, and then an end face turning process is performed. Here, the plurality of second parameters input to the inference unit 24 and the first parameter that is the inference result are collectively referred to as program generation parameters PA121. The inference unit 24 uses the second parameters input from the machining program generation unit 23 as input data and uses the learning model corresponding to the indicated first parameter among the learning models stored in the learning model storage unit 15 so as to infer the value of the first parameter, and inputs the inference result to the machining program generation unit 23.

Step S406 is repeated for the number of first parameters acquired. The machining program generation unit 23 can input, to the inference unit 24, the second parameters of the material property "S45C", the material length "120 mm", the material outer diameter "150 mm", the material inner diameter "0 mm", the radial allowance "30 mm", and the axial allowance "30 mm", and acquire the first parameter "0" as the inference result from the inference unit 24. Here, the first parameter "0" indicates that the value of the outer diameter is 0. Here, the plurality of second parameters input to the inference unit 24 and the first parameter that is the inference result are collectively referred to as program generation parameters PA122.

The machining program generation unit 23 can input, to the inference unit 24, the second parameters of the material property "S45C", the material length "120 mm", the material outer diameter "150 mm", the material inner diameter "0 mm", the radial allowance "10 mm", and the axial allowance "20 mm", and acquire the first parameter "0" as the inference result from the inference unit 24. Here, the first parameter "0" indicates bar turning. Here, the plurality of second parameters input to the inference unit 24 and the first parameter that is the inference result are collectively referred to as program generation parameters PA123.

The machining program generation unit 23 can input, to the inference unit 24, the second parameters of the material property "S45C", the material length "120 mm", the material outer diameter "150 mm", the material inner diameter "0 mm", the radial allowance "10 mm", and the axial allowance "20 mm", and acquire the first parameter "0" as the inference result from the inference unit 24. Here, the first parameter "0" indicates that the machining site is the outer diameter. Here, the plurality of second parameters input to the inference unit 24 and the first parameter that is the inference result are collectively referred to as program generation parameters PA124.

Note that an end face turning process is a process of performing end face turning in which the protruding portion of a material end face is scraped off with an end face turning tool. A drill turning process is a process of performing drill turning in which a hole is drilled in a radial central region of the material along the central axis with a turning drill. A bar turning process is a process of performing bar turning in which the outer diameter, inner diameter, front face, or back face of a round-bar material is cut with a turning tool. A groove turning process is a process of performing groove turning in which the outer diameter, inner diameter, front face, or back face of a round-bar material is grooved with a groove turning tool. An end face allowance is a cutting allowance for end face turning.

Next, the machining program generation unit 23 uses the program generation parameters PA121 to 124 to divide the turning cross-sectional shape t of the machining removal shape into a plurality of different machining processes and generate turning shapes (step S407). Turning shapes are turning cross-sectional shapes for a plurality of different machining processes through which the machining shape is carved out from the material.

Figure 11:
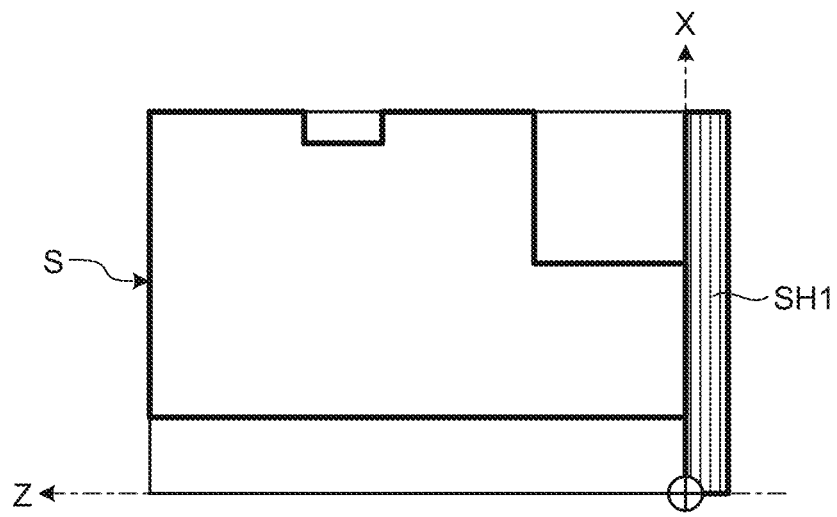
FIG. 11 is a diagram illustrating a turning shape for an end face turning process.
Figure 12:
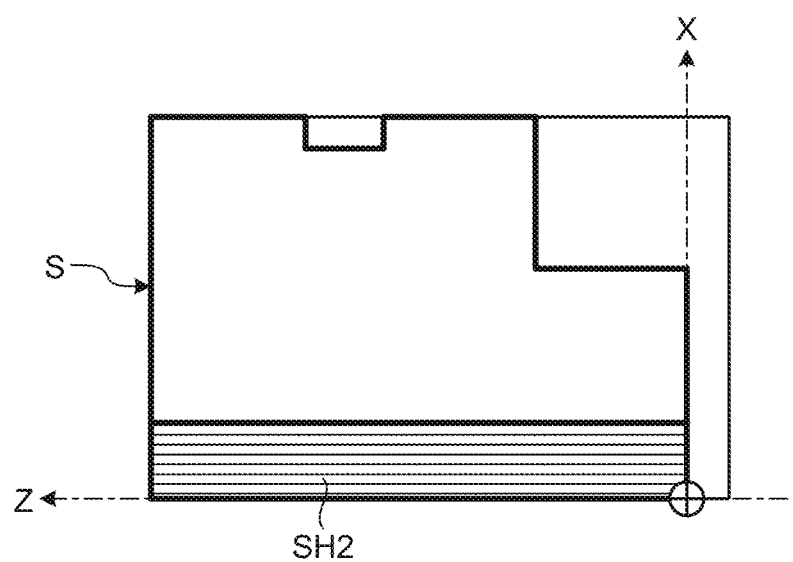
FIG. 12 is a diagram illustrating a turning shape for a drill turning process.
Figure 13:
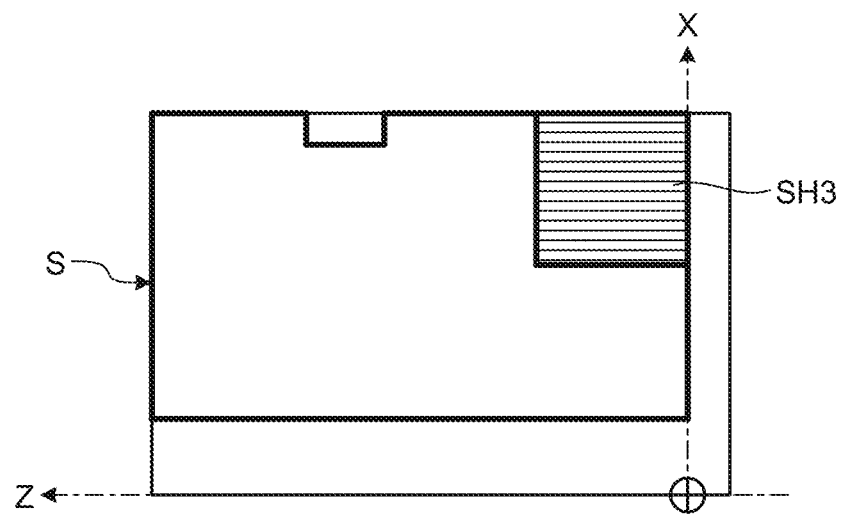
FIG. 13 is a diagram illustrating a turning shape for a bar turning process.
Figure 14:
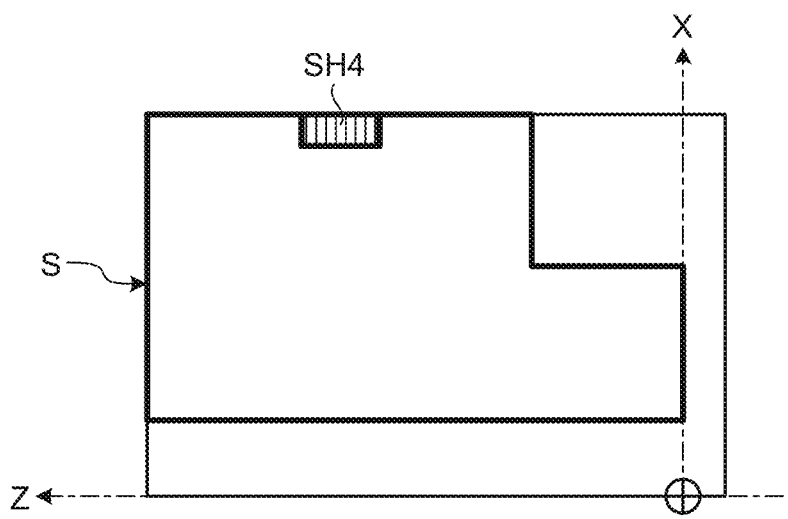
FIG. 14 is a diagram illustrating a turning shape for a bar turning process.

Hereinafter, a procedure for dividing the turning cross-sectional shape t will be described. FIG. 11 is a diagram illustrating a turning shape SH1 for an end face turning process. FIG. 12 is a diagram illustrating a turning shape SH2 for a drill turning process. FIG. 13 is a diagram illustrating a turning shape SH3 for a bar turning process. FIG. 14 is a diagram illustrating a turning shape SH4 for a bar turning process.

The machining program generation unit 23 acquires the information of the end face allowance "10 mm" from the turning cross-sectional shape t1. The machining program generation unit 23 refers to the program generation parameters PA121, in which the value of the first parameter representing the machining order indicates that "a drill turning process is performed first, and then an end face turning process is performed". Accordingly, as illustrated in FIG. 11, the machining program generation unit 23 separates the turning shape SH1 for the end face turning process from the turning cross-sectional shape t1 illustrated in FIG. 10.

Next, the machining program generation unit 23 refers to the program generation parameters PA121, in which the value of the first parameter representing the machining site indicates "outer diameter". Accordingly, as illustrated in FIG. 12, the machining program generation unit 23 separates the turning shape SH2 for the drill turning process from the turning cross-sectional shape t1 illustrated in FIG. 10.

Next, as illustrated in FIG. 13, the machining program generation unit 23 separates the turning shape SH3 for the bar turning process from the turning cross-sectional shape t1 illustrated in FIG. 10. As illustrated in FIG. 14, the machining program generation unit 23 separates the turning cross-sectional shape t2 illustrated in FIG. 10 that is the turning shape SH4 for the bar turning process.

Returning to FIG. 6, the machining program generation unit 23 generates each process of the machining program based on the program generation parameters PA121 to 124 including the inference results of the first parameters and the generated turning shapes (step S408).

Figure 15:
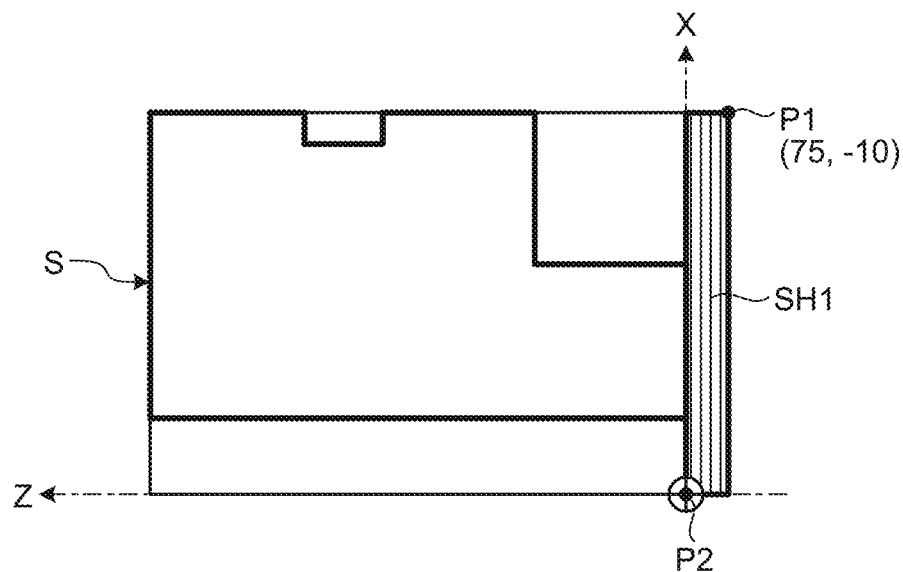
FIG. 15 is a diagram illustrating the coordinates of the machining start point and machining end point of the turning process for the turning shape illustrated in FIG. 11.

Specifically, the machining program generation unit 23 generates turning processes by assigning turning processes to the turning shapes based on the program generation parameters PA121 to 124. FIG. 15 is a diagram illustrating the coordinates of the machining start point and machining end point of the turning process for the turning shape SH1 illustrated in FIG. 11. Based on the program generation parameters PA121 to 124, the machining program generation unit 23 calculates the machining start point P1 (75, −10) and the machining end point P2 of the turning process for the turning shape SH1, and assigns the machining start point P1 and the machining end point P2 to the turning shape SH1 to generate a machining program for the turning process LC1.

Figure 16:
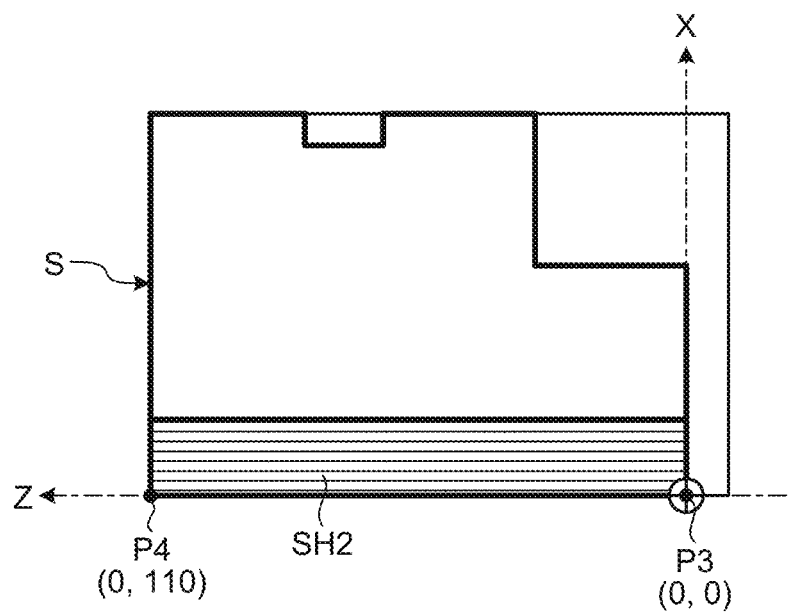
FIG. 16 is a diagram illustrating the coordinates of the machining start point and machining end point of the drill turning process for the turning shape illustrated in FIG. 12.

FIG. 16 is a diagram illustrating the coordinates of the machining start point and machining end point of the drill turning process for the turning shape SH2 illustrated in FIG. 12. Based on the program generation parameters PA121 to 124, the machining program generation unit 23 calculates the machining start point P3 (0, 0) and the machining end point P4 (0, 110) of the drill turning process for the turning shape SH2, and assigns the machining start point P3 and the machining end point P4 to the turning shape SH2 to generate a machining program for the turning drill process LC2.

Figure 17:
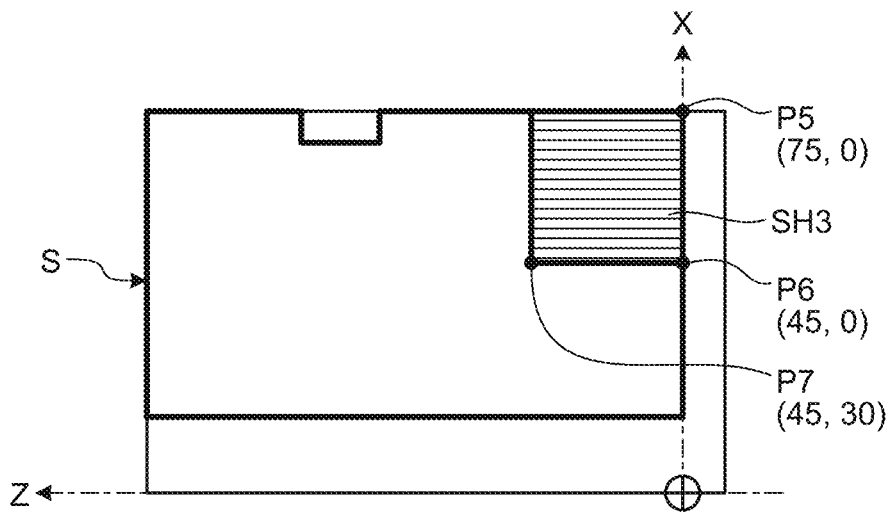
FIG. 17 is a diagram illustrating the coordinates of the cutting point, machining start point, and machining end point of the bar turning process for the turning shape illustrated in FIG. 13.

FIG. 17 is a diagram illustrating the coordinates of the cutting point, machining start point, and machining end point of the bar turning process for the turning shape SH3 illustrated in FIG. 13. From the turning shape SH3 for the bar turning process, the information of the length of the opening shape in the X-axis direction (30 mm) and the information of the length of the opening shape in the Z-axis direction (30 mm) are acquired. The machining program generation unit 23 sets the machining site "outer diameter" with reference to the program generation parameters PA122, and acquires the coordinates of the cutting point P5 (75, 0), the machining start point P6 (45, 0), and the machining end point P7 (45, 30) of the bar turning process from the turning shape SH3 to generate a machining program for the bar outer diameter turning process LC3, which is a bar turning process in which the machining site is the outer diameter.

Figure 18:
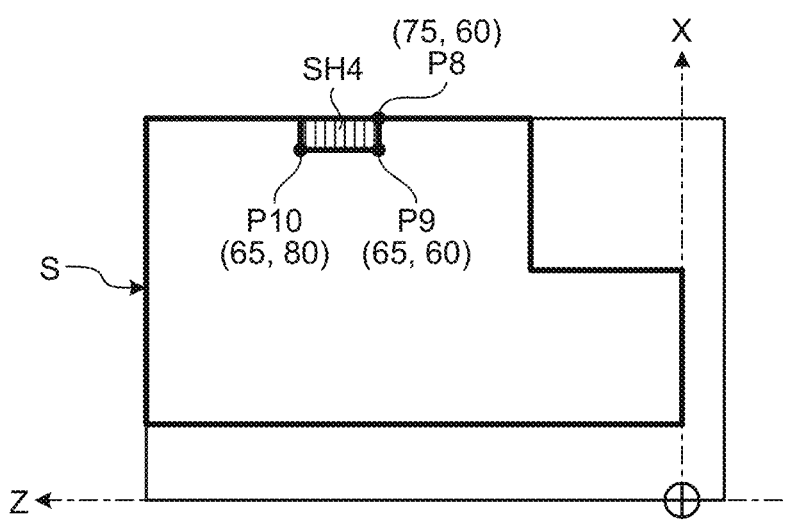
FIG. 18 is a diagram illustrating the coordinates of the cutting point, machining start point, and machining end point of the bar turning process for the turning shape illustrated in FIG. 14.

FIG. 18 is a diagram illustrating the coordinates of the cutting point, machining start point, and machining end point of the bar turning process for the turning shape SH4 illustrated in FIG. 14. From the turning shape SH4 for the bar turning process, the machining program generation unit 23 acquires the information of the length of the opening shape in the X-axis direction (10 mm) and the information of the length of the opening shape in the Z-axis direction (20 mm). The machining program generation unit 23 sets the machining site "outer diameter" with reference to the program generation parameters PA124, and acquires the coordinates of the cutting point P8 (75, 60), the machining start point P9 (65, 60), and the machining end point P10 (65, 80) of the bar turning process from the turning shape SH4 to generate a machining program for the bar outer diameter turning process LC4, which is a bar turning process in which the machining site is the outer diameter.

By performing the processing illustrated in FIG. 6 as described above, the machining program generation unit 23 can automatically generate a plurality of different turning processes for carving out the machining shape from the material with reference to the program generation parameters PA121 to 124.

Here, each first parameter is determined using a learning model generated from machining programs created in the past. The machining programs created in the past contain accumulated knowledge and experience of the operator, which makes it possible to automatically and easily generate a machining program in the same manner as when the operator him/herself creates the machining program by hand.

In addition, even when a wide variety of parameters must be adjusted for generating a machining program, the machining program can be easily generated.

Second Embodiment

Because the configuration of the numerical control device 100 according to the second embodiment is the same as that in the first embodiment illustrated in FIG. 1, the description thereof is omitted.

Hereinafter, the operation of the numerical control device 100 will be described. In the second embodiment, as in the first embodiment, the operation of the numerical control device 100 includes learning model generation processing that is performed by the machine learning device 10 and machining program generation processing that is performed by the machining program generation device 20.

Figure 19:
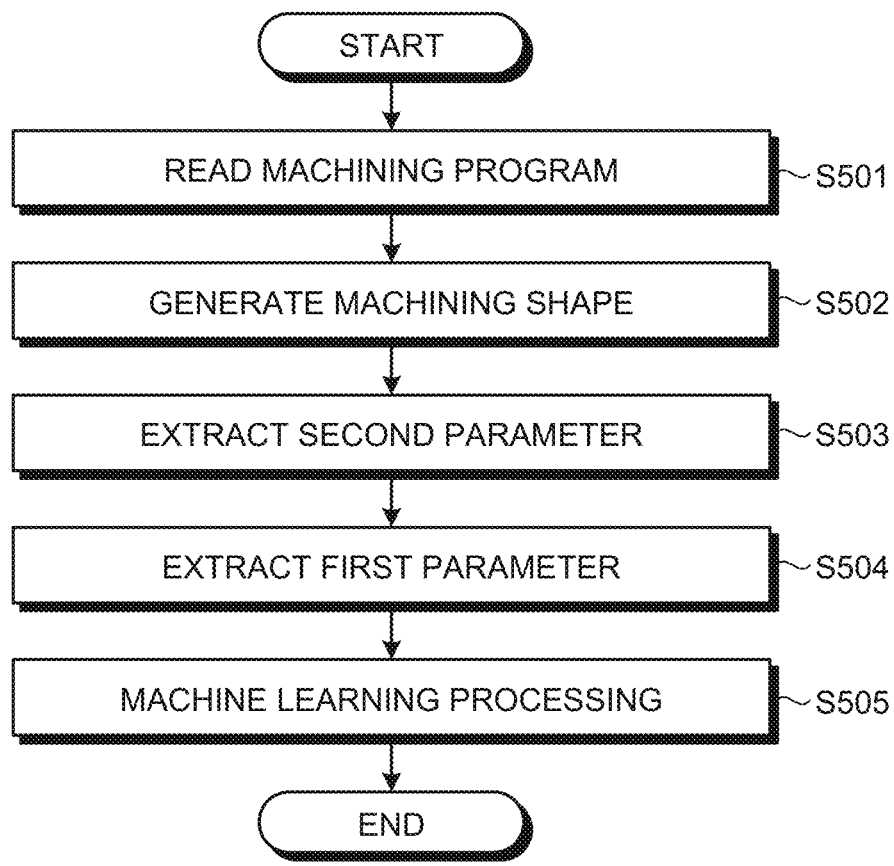
FIG. 19 is a flowchart illustrating an outline of learning model generation processing according to a second embodiment of the present invention.

First, an outline of learning model generation processing that is performed by the machine learning device 10 will be described. FIG. 19 is a flowchart illustrating an outline of learning model generation processing according to the second embodiment of the present invention.

First, the machining program input unit 11 reads a plurality of machining programs 1 from a storage area (not illustrated), and stores the plurality of machining programs 1 in the machining program storage unit 12 (step S501). Based on the machining programs 1 stored in the machining program storage unit 12, the data extraction unit 13 generates, for each machining program 1, a machining shape that is a finished workpiece shape (step S502).

The data extraction unit 13 extracts second parameters from the machining programs 1 stored in the machining program storage unit 12 and the machining shapes generated in step S502 (step S503).

Next, the data extraction unit 13 extracts first parameters from the machining programs 1 stored in the machining program storage unit 12 (step S504). Next, the machine learning unit 14 generates a data set based on the combinations of first and second parameters extracted by the data extraction unit 13, and performs machine learning processing (step S505). The machine learning unit 14 stores the learning model generated as the result of machine learning in the learning model storage unit 15.

Because an outline of machining program generation processing is the same as that in the first embodiment, the description thereof is omitted.

FIG. 20 is a flowchart illustrating details of the learning model generation processing illustrated in FIG. 19. First, the machining program input unit 11 reads the machining programs 1 from a storage area (not illustrated), and stores the machining programs 1 in the machining program storage unit 12 (step S601).

The data extraction unit 13 extracts parameters from each of the plurality of machining programs 1 stored in the machining program storage unit 12 (step S602).

FIG. 21 is a diagram illustrating an example of a machining program that is read by the machine learning device 10 in the second embodiment. Examples of parameters that are extracted from the machining program illustrated in FIG. 21 include parameters related to materials, parameters related to machining, parameters related to tools, and parameters related to machining positions. The parameters related to materials are the material property "CST IRN", the material outer diameter "6", the material inner diameter "1.5", the material length "7", the material end face "0", and the material rotation speed "1500". The parameters related to machining are the unit number "4", the angle B "90", the angle C "0", the machining type "bar", the machining part "outer diameter", the cut-X "6.0", the cut-Z "0", the finishing allowance-X "0.1", and the finishing allowance-Z "0.1". The parameters related to tools are the tool sequence number "1", the machining type "rough machining", the tool type "outer shape turning", the nominal diameter "1", the suffix "A", the machining pattern "0", the maximum amount of cut "0.3", the peripheral speed "100", the feed "1", the tool sequence number "2", the machining type "finishing", the tool type "outer shape turning", the nominal diameter "1", the suffix "B", the machining pattern "0", the maximum amount of cut "0.3", the peripheral speed "100", and the feed "1". The parameters related to machining positions are the shape sequence number "1", the shape pattern "taper", the front corner "0", the start point-X "3", the start point-Z "0", the end point-X "5.27176", the end point-Z "1.9674", the back corner "0", the shape sequence number "2", the shape pattern "taper", the front corner "0", the start point-X "5.27176", the start point-Z "1.9674", the end point-X "5.27176", the end point-Z "2.9674", and the back corner "0".

Further, parameters that are extracted from the machining program illustrated in FIG. 21 include the following parameters. The parameters related to machining are the unit number "6", the angle B "0", the angle C "0", the machining type "drill", the hole diameter "0.5156", the hole depth "0.59", and the chamfer "0". The parameters related to tools are the tool sequence number "1", the tool type "drill", the nominal diameter "0.52", the suffix "none", the drilled hole diameter "0.52", the drilled hole depth "0.5", the pilot hole diameter "0", the feed speed change rate "100", the machining cycle "drill cycle", the amount of cut "0.26", the peripheral speed "10", and the feed "1". The features related to machining positions are the shape sequence number "1", the shape pattern "circle", Z "0", X "0", Y "0", the angle between the start point and the X axis "0.008", the radius "1.08307", and the number of holes "4".

Figure 22:
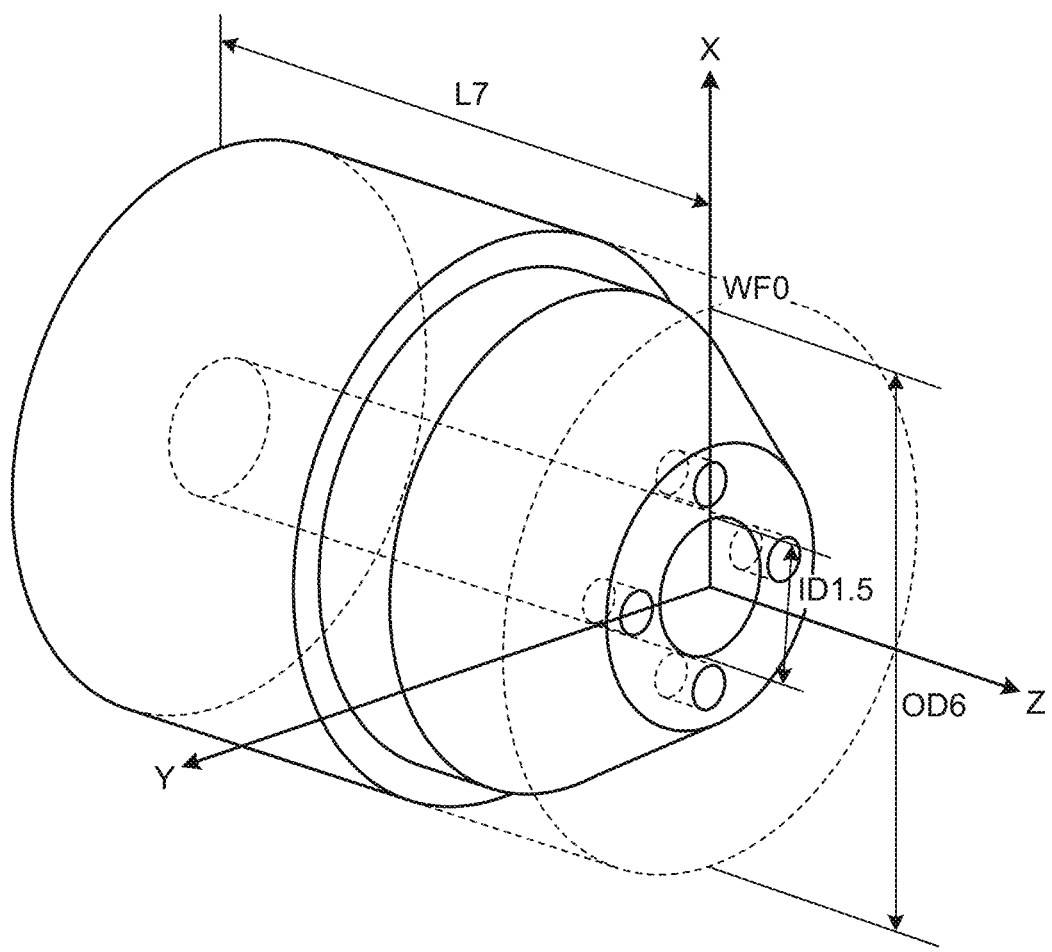
FIG. 22 is a diagram illustrating an example of a machining shape that is generated in step S603 of FIG. 20.

Returning to FIG. 20, the data extraction unit 13 then generates a machining shape from each of the plurality of machining programs stored in the machining program storage unit 12 (step S603). FIG. 22 is a diagram illustrating an example of a machining shape that is generated in step S603 of FIG. 20. Note that a machining shape can be generated from a machining program using the techniques disclosed in Japanese Patent No. 5349713, Japanese Patent No. 5905159, Japanese Patent No. 5936781, and the like.

Returning to FIG. 20, the data extraction unit 13 extracts second parameters from the machining shapes generated in step S603 (step S604). Second parameters that can be extracted from the machining shape generated here are the product length "7", the product maximum outer diameter "6", the product minimum outer diameter "3", the product maximum inner diameter "1.5", the product minimum inner diameter "1.5", and the like.

The data extraction unit 13 narrows down the second parameters for each first parameter (step S605). For example, suppose that the type of first parameter is machining site, and the value of the first parameter is one of four values from 0 to 3, where "0" represents outer diameter, "1" represents inner diameter, "2" represents front face, and "3" represents back face. In this case, the second parameters narrowed down based on the type of first parameter are the material property "CST IRN", the material outer diameter "6", the material inner diameter "1.5", the material length "7", the material end face "0", the machining type "bar turning", the radial allowance "2.2716", the axial allowance "1.9674", the product length "7", the product maximum outer diameter "6", the product minimum outer diameter "3", the product maximum inner diameter "1.5", the product minimum outer diameter "1.5", the machining site maximum X "5.27176", the machining site minimum X "3", the machining site maximum Z "1.9674", and the machining site minimum Z "0". The value of the first parameter is "0".

In addition, suppose that the type of first parameter is drilling method, and the value of the first parameter is one of four values from 0 to 3, where "0" represents drill cycle, "1" represents high-speed deep hole cycle, "2" represents deep hole cycle, and "3" represents ultra-deep hole cycle. In this case, the second parameters narrowed down based on the type of first parameter are the material property "CST IRN", the material outer diameter "6", the material inner diameter "1.5", the material length "7", the material end face "0", the machining type "drilling", the drilled hole diameter "0.52", the drilled hole depth "0.5" the product length "7", the product maximum outer diameter "6", the product minimum outer diameter "3", the product maximum inner diameter "1.5", the product minimum outer diameter "1.5", the machining site maximum X "1.08307", the machining site minimum X "−1.08307", the machining site maximum Z "0", and the machining site minimum Z "0". The value of the first parameter is "0".

The data extraction unit 13 generates a data set of first and second parameters, and inputs the generated data set to the machine learning unit 14 (step S606).

The machine learning unit 14 performs machine learning according to the data set input from the data extraction unit 13, and generates a learning model for each first parameter (step S607). The machine learning unit 14 stores the generated learning model in the learning model storage unit 15 (step S608).

Figure 23:
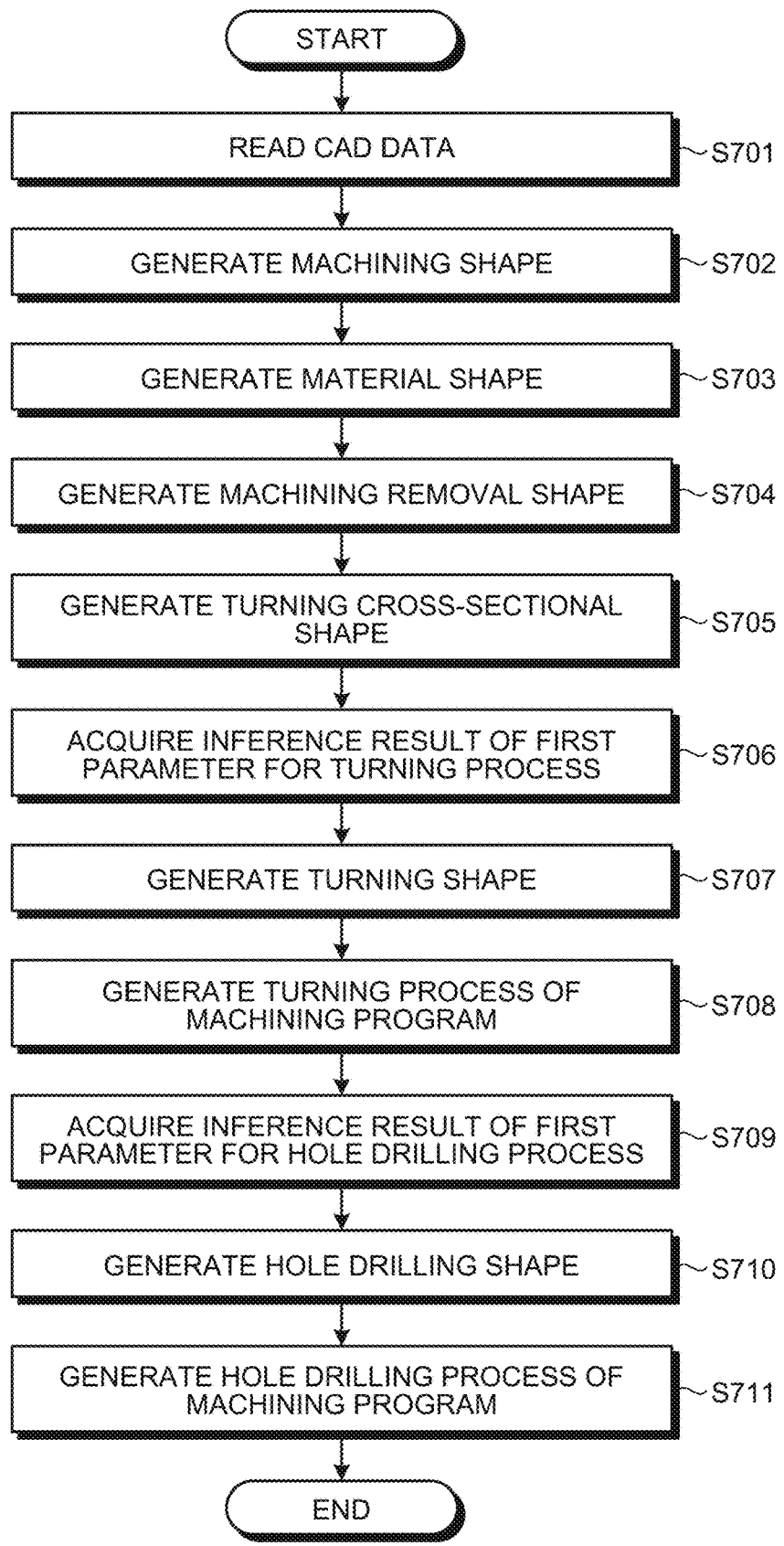
FIG. 23 is a flowchart illustrating details of machining program generation processing according to the second embodiment.
Figure 24:
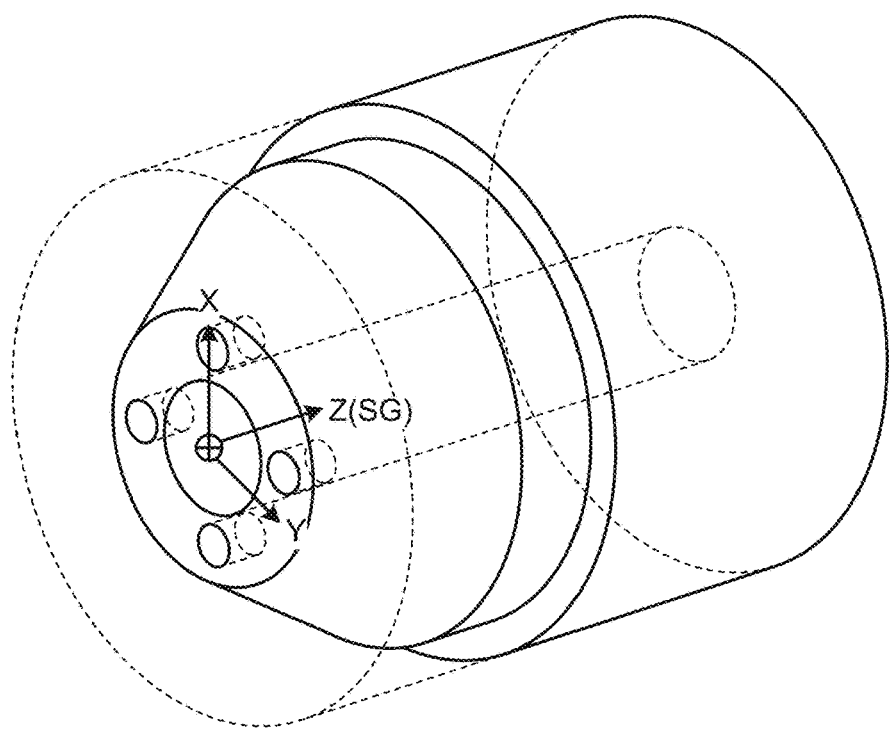
FIG. 24 is a perspective view illustrating a machining shape indicated by CAD data used in the second embodiment.

FIG. 23 is a flowchart illustrating details of machining program generation processing according to the second embodiment. First, the machining program generation unit 23 reads the CAD data 2 that are the machining shape data stored in the machining shape data storage unit 22 (step S701). The CAD data 2 are design data including an original workpiece shape and a finished workpiece shape. FIG. 24 is a perspective view illustrating a machining shape indicated by the CAD data 2 used in the second embodiment.

Returning to FIG. 23, the machining program generation unit 23 generates the machining shape illustrated in FIG. 24 based on the read CAD data 2, and arranges the machining shape at the program origin, i.e. the machining origin of the program coordinate system (step S702).

In the program coordinate system, the Z axis of the X, Y, and Z axes is set as a turning axis SG, i.e. the central axis for turning. When arranging the machining shape at the program origin, the machining program generation unit 23 moves and rotates the machining shape such that the rotation axis of the cylindrical surface or conical surface having the largest diameter coincides with the Z axis. In addition, the end face of the machining shape in the Z-axis direction is moved to coincide with the program origin. That is, the machining program generation unit 23 extracts, as a cutting end face from the CAD data 2, a cylindrical surface or a conical surface whose rotation center axis is the same as the turning axis SG. Therefore, the machining program generation unit 23 generates, from the CAD data 2, a three-dimensional machining shape whose rotation center axis is the turning axis.

Figure 25:
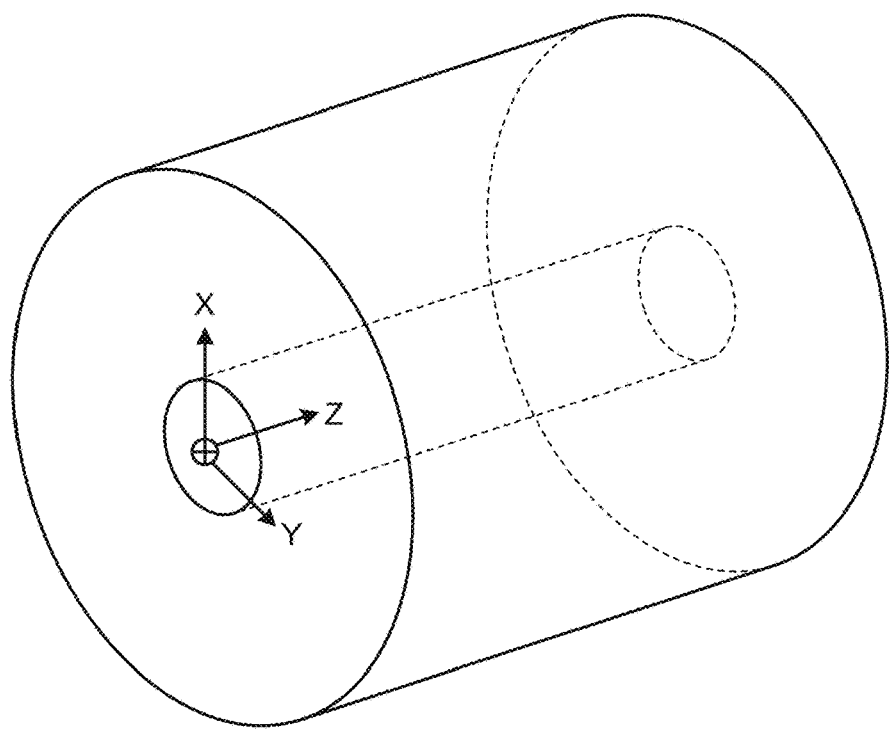
FIG. 25 is a perspective view illustrating a material shape that is generated based on the CAD data used in the second embodiment.

Returning to FIG. 23, the machining program generation unit 23 then generates a three-dimensional material shape based on the read CAD data 2 (step S703). Specifically, the machining program generation unit 23 generates a three-dimensional cylindrical shape that encompasses the machining shape arranged at the program origin, and arranges the three-dimensional cylindrical shape in the program coordinate system in the same manner as when arranging the machining shape. FIG. 25 is a perspective view illustrating a material shape that is generated based on the CAD data 2 used in the second embodiment. The material shape is the original workpiece shape. The dimensions of the material shape can be found from the maximum and minimum values of the machining shape in each of the X-, Y-, and Z-axis directions. Here, the material shape has the material outer diameter "6", the material length "7", and the material property "CST IRN".

Figure 26:
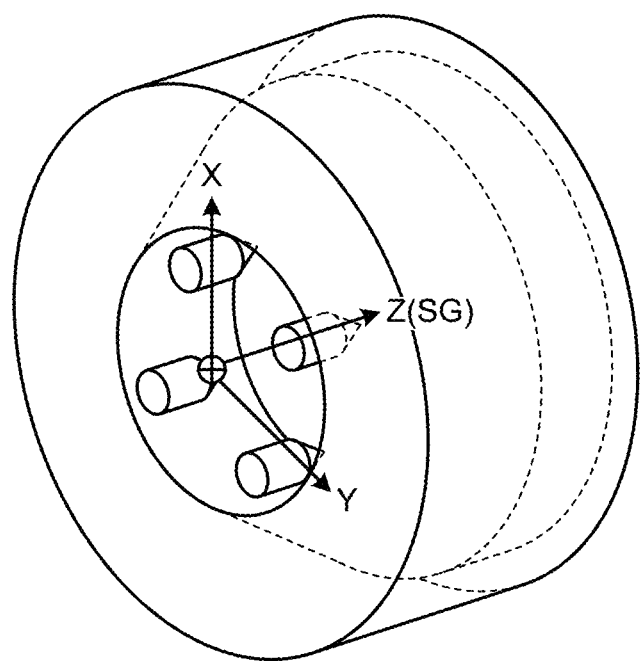
FIG. 26 is a perspective view illustrating a machining removal shape that is generated in the second embodiment.

Based on the material shape and the machining shape, the machining program generation unit 23 generates a machining removal shape that is the shape to be removed through turning from the material shape (step S704). FIG. 26 is a perspective view illustrating a machining removal shape that is generated in the second embodiment. In FIG. 26, the machining shape is represented by broken lines. The machining removal shape can be found by means of a difference calculation in which the solid model of the machining shape is subtracted from the solid model of the material shape.

Figure 27:
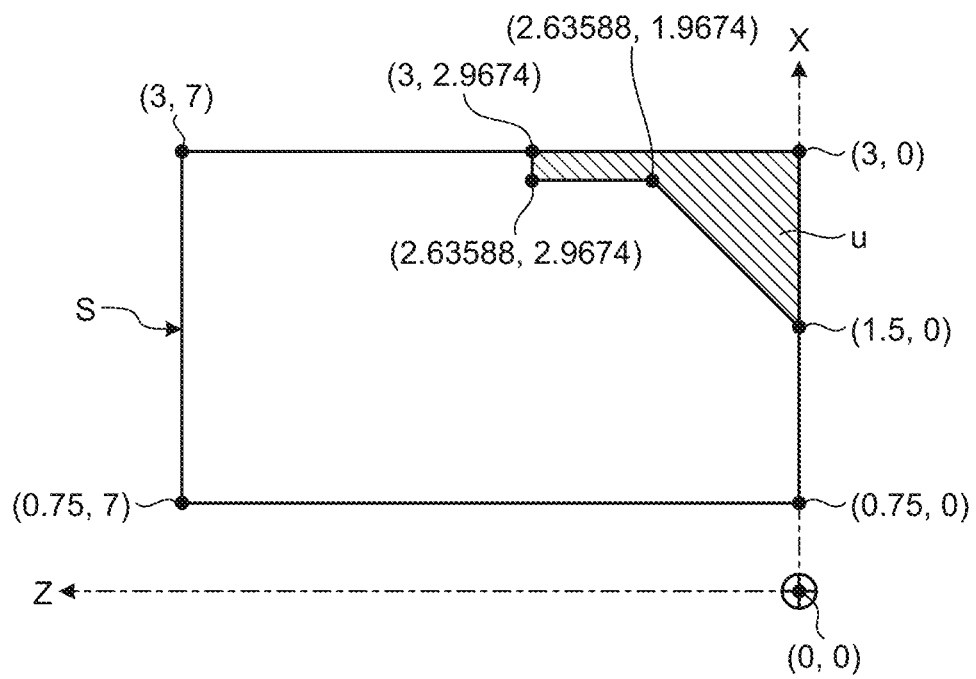
FIG. 27 is a diagram illustrating a turning cross-sectional shape that is a cross-sectional shape of the machining removal shape illustrated in FIG. 26.

Next, the machining program generation unit 23 generates a turning cross-sectional shape u that is a cross-sectional shape of the machining removal shape (step S705). FIG. 27 is a diagram illustrating the turning cross-sectional shape u that is a cross-sectional shape of the machining removal shape illustrated in FIG. 26. The turning cross-sectional shape illustrated in FIG. 27 is a ½ turning cross-sectional shape obtained by projecting the machining removal shape onto a +XZ plane, i.e. +X region of the XZ plane. The machining program generation unit 23 can find the turning cross-sectional shape u by finding a cross-sectional shape by multiplying the cross-sectional model on the XZ plane and the solid model consisting of the machining shape, and limiting the range to a region where X is not less than zero.

Returning to FIG. 23, the machining program generation unit 23 provides, to the inference unit 24, an indication of the type of first parameter to be inferred and an input of second parameters, and acquires the inference result of the first parameter for the turning process (step S706). For example, the machining program generation unit 23 inputs, to the inference unit 24, the second parameters of the material property "CST IRN", the material length "7", the material outer diameter "6", the material inner diameter "1.5", the material end face "0", the machining type "bar turning", the radial allowance "2.2716", the axial allowance "1.9674", the product length "7", the product maximum outer diameter "6", the product minimum outer diameter "3", the product maximum inner diameter "1.5", the product minimum inner diameter "1.5", the machining site maximum X "5.27176", the machining site minimum X "3", the machining site maximum Z "1.9674", and the machining site minimum Z "0", and acquires the first parameter "0" as the inference result from the inference unit 24. Here, the first parameter "0" indicates that the machining site is the "outer diameter". Here, the plurality of second parameters input to the inference unit 24 and the first parameter that is the inference result are collectively referred to as program generation parameters PA125. The inference unit 24 uses the second parameters input from the machining program generation unit 23 as input data, and uses the learning model corresponding to the indicated first parameter among the learning models stored in the learning model storage unit 15 so as to infer the value of the first parameter, and inputs the inference result to the machining program generation unit 23.

Next, the machining program generation unit 23 generates a turning shape (step S707). Turning shapes are turning cross-sectional shapes for a plurality of different machining processes through which the machining shape is carved out from the material. Here, because it is not necessary to divide the machining process, the turning cross-sectional shape u itself is used as the turning shape.

The machining program generation unit 23 generates the turning process of the machining program based on the program generation parameters PA125 including the inference result of the first parameter and the generated turning shape (step S708).

Figure 28:
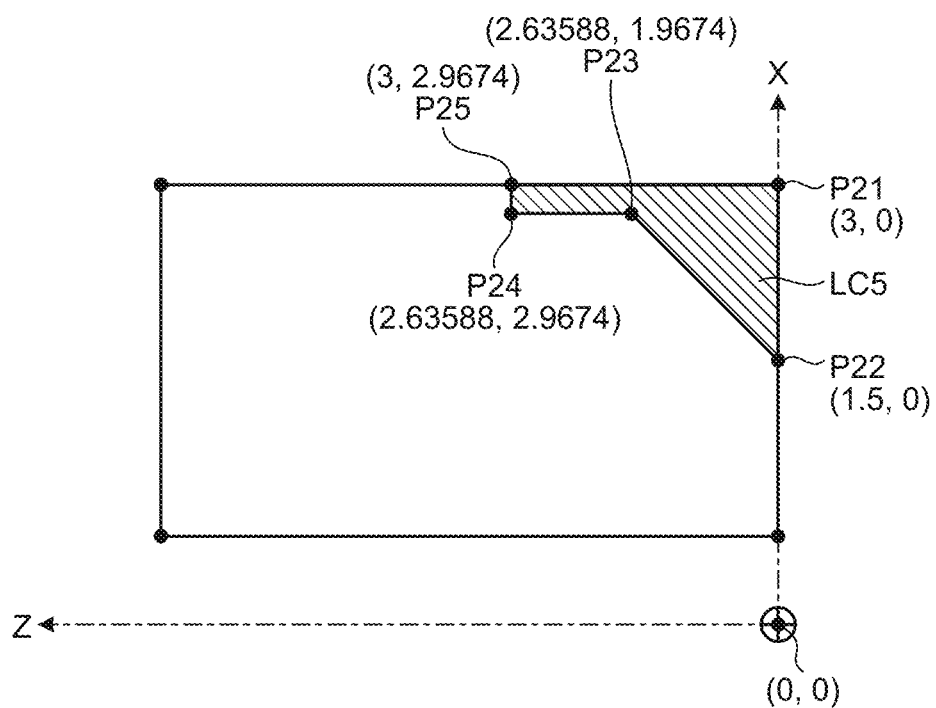
FIG. 28 is a diagram illustrating the coordinates of the cutting point, machining start point, machining intermediate points, and machining end point of the turning process for the turning shape.

FIG. 28 is a diagram illustrating the coordinates of the cutting point, machining start point, machining intermediate points, and machining end point of the turning process for the turning shape SH5. Based on the program generation parameters PA125, the machining program generation unit 23 calculates the cutting point P21 (3, 0), the machining start point P22 (1.5, 0), the machining intermediate point P23 (2.63588, 1.9674), the machining intermediate point P24 (2.63588, 2.9674), and the machining end point P25 (3, 2.9674) of the turning process for the turning shape SH5, and assigns the cutting point P21, the machining start point P22, the machining intermediate point P23, the machining intermediate point P24, and the machining end point P25 to the turning shape SH5 to generate a machining program for the turning process.

Returning to FIG. 23, the machining program generation unit 23 provides, to the inference unit 24, an indication of the type of first parameter to be inferred and an input of second parameters, and acquires the inference result of the first parameter for the hole drilling process (step S709). For example, the machining program generation unit 23 inputs, to the inference unit 24, the second parameters of the material property "CST IRN", the material length "7", the material outer diameter "6", the material inner diameter "1.5", the material end face "0", the machining type "drilling", the drilled hole diameter "0.52", the drilled hole depth "0.5", the product length "7", the product maximum outer diameter "6", the product minimum outer diameter "3", the product maximum inner diameter "1.5", the product minimum inner diameter "1.5", the machining site maximum X "1.08307", the machining site minimum X "−1.08307", the machining site maximum Z "0", and the machining site minimum Z "0", and acquires the first parameter "0" that is the inference result from the inference unit 24. Here, the first parameter "0" indicates that the machining method is "drill cycle". Here, the plurality of second parameters input to the inference unit 24 and the first parameter that is the inference result are collectively referred to as program generation parameters PA126. The inference unit 24 uses the second parameters input from the machining program generation unit 23 as input data, and uses the learning model corresponding to the indicated first parameter among the learning models stored in the learning model storage unit 15 so as to infer the value of the first parameter, and inputs the inference result to the machining program generation unit 23.

The machining program generation unit 23 generates a hole drilling shape (step S710). Next, the machining program generation unit 23 generates the hole drilling process of the machining program based on the program generation parameters PA126 including the inference result of the first parameter and the generated hole drilling shape (step S711).

Figure 29:
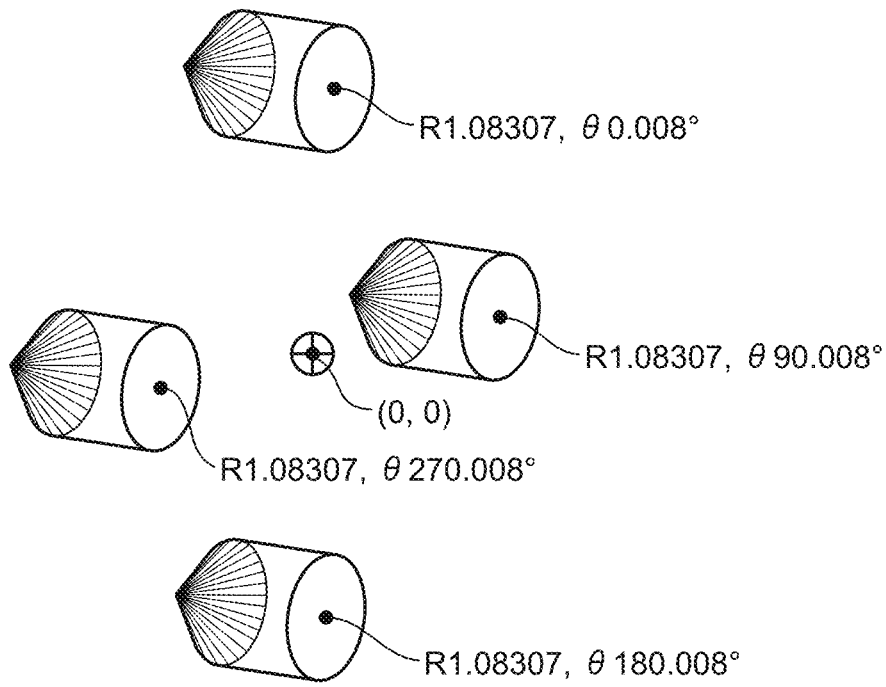
FIG. 29 is an explanatory diagram illustrating a hole drilling process according to the second embodiment.

FIG. 29 is an explanatory diagram illustrating the hole drilling process according to the second embodiment. The hole drilling process is indicated by parameters such as the drilled hole diameter "0.5156", the hole depth "0.5", the chamfer "0", the tool type "drill", the nominal diameter "0.52", the drilled hole diameter "0.52", the drilled hole depth "0.5", the pilot hole diameter "0", the machining cycle "drill cycle", the shape pattern "circle", Z "0", X "0", Y "0", the angle between the start point and the X axis "0.008°", the radius "1.08307", and the number of holes "4". Using these parameters, the machining program generation unit 23 generates the hole drilling process of the machining program.

Figure 30:
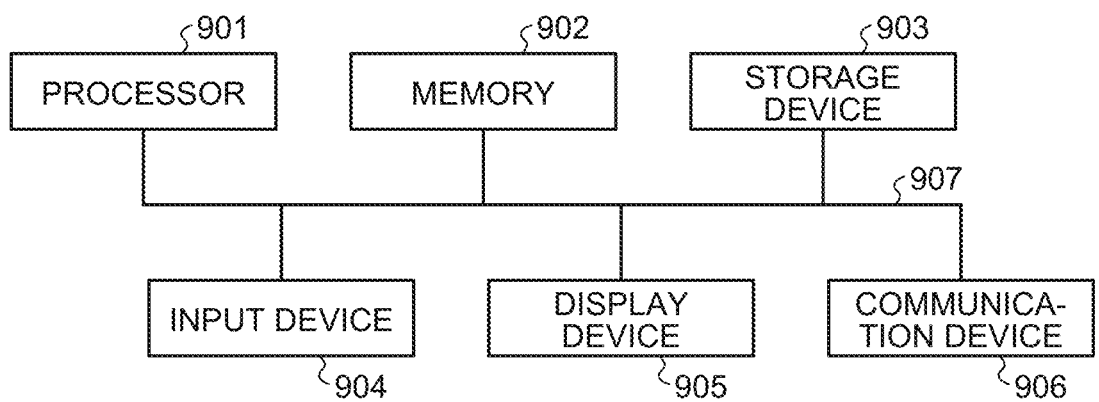
FIG. 30 is a diagram illustrating a hardware configuration of the machine learning device and the machining program generation device illustrated in FIG. 1.

FIG. 30 is a diagram illustrating a hardware configuration of the machine learning device 10 and the machining program generation device 20 illustrated in FIG. 1. Each functional unit illustrated in FIG. 1 includes a processor 901, a memory 902 that the processor 901 uses as a work area, a storage device 903 that stores a computer program describing each function of the numerical control device 100, an input device 904 as an input interface for the operator, a display device 905 as an output device that displays information to the operator, and a communication device 906 having a function of communicating with an apparatus to be controlled, another numerical control device, or the like. The processor 901, the memory 902, the storage device 903, the input device 904, the display device 905, and the communication device 906 are coupled by a data bus 907.

The processor 901 is a processing device, an arithmetic device, a microprocessor, a microcomputer, a central processing unit (CPU), a digital signal processor (DSP), or the like. Examples of the memory 902 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM, registered trademark), and the like.

The machining program input unit 11, the data extraction unit 13, and the machine learning unit 14 can be implemented, for example, by the processor 901 reading and executing a computer program stored in the memory 902 illustrated in FIG. 30. A plurality of processors 901 and a plurality of memories 902 may cooperate to implement the above functions. Some of the functions of the machine learning unit 14 may be embodied as an electronic circuit, and the other functions may be implemented using the processor 901 and the memory 902.

Similarly, the machining shape data input unit 21, the machining shape data storage unit 22, the machining program generation unit 23, and the inference unit 24 can be implemented by the processor 901 reading and executing a computer program stored in the memory 902. A plurality of processors 901 and a plurality of memories 902 may cooperate to implement the above functions. Some of the functions of the machining shape data input unit 21, the machining shape data storage unit 22, the machining program generation unit 23, and the inference unit 24 may be implemented as an electronic circuit, and the other functions may be implemented using the processor 901 and the memory 902. The processor 901 and the memory 902 for implementing the functions of the machining shape data input unit 21, the machining shape data storage unit 22, the machining program generation unit 23, and the inference unit 24 may be the same as or different from the processor 901 and the memory 902 for implementing the machine learning unit 14.

As described above, the machine learning device 10 according to the first and second embodiments of the present invention can acquire first parameters, i.e. parameters to be adjusted that can be machine-learned, based on the machining programs 1, and can extract second parameters, i.e. non-adjustable parameters that are used for inferring first parameters, for each of the first parameters acquired, thereby automatically generating a learning model. This learning model is generated based on the machining programs created in the past, and thus advantageously contains the past knowledge and experience accumulated in the machining programs.

In addition, the machining program generation device 20 infers first parameters using the learning model generated by the machine learning device 10 to automatically generate a machining program using the inference results. Therefore, the machining program generation device 20 can easily generate a high-quality machining program in which the knowledge and experience accumulated in the past machining programs are utilized.

In addition, the machine learning device 10 according to the second embodiment can generate machining shapes from the machining programs 1 and extract second parameters from the machining shapes. This can expand the types of extractable parameters, leading to improved accuracy of the learning model.

The configurations described in the above-mentioned embodiments indicate examples of the content of the present invention. The configurations can be combined with another well-known technique, and some of the configurations can be omitted or changed in a range not departing from the gist of the present invention.

For example, in the above-described first and second embodiments, the machine learning device 10 and the machining program generation device 20 are incorporated in the same numerical control device 100, but the present embodiment is not limited to this example. The machine learning device 10 and the machining program generation device 20 may be independently provided outside the numerical control device 100.

In addition, in the above-described first and second embodiments, the machine tool to be numerically controlled with machining programs is a lathe, but the machine tool to be numerically controlled is not limited to a lathe and may be another machine tool.

REFERENCE SIGNS LIST

1 machining program; 2 CAD data; 10 machine learning device; 11 machining program input unit; 12 machining program storage unit; 13 data extraction unit; 14 machine learning unit; 15 learning model storage unit; 20 machining program generation device; 21 machining shape data input unit; 22 machining shape data storage unit; 23 machining program generation unit; 24 inference unit; 25 machining program storage unit; 30 interactive operation processing unit; 40 instruction input unit; 50 display unit; 100 numerical control device; 901 processor; 902 memory; 903 storage device; 904 input device; 905 display device; 906 communication device; 907 data bus; t, t1, t2, u turning cross-sectional shape; SH1, SH2, SH3, SH4, SH5 turning shape.

The invention claimed is:

1. A machine learning device comprising:
a first processor; and
a first memory to store a first program which, when executed by the first processor, causes the first processor to perform a process including:
reading a plurality of machining programs for numerically controlling a machine tool;
extracting, from parameters of the plurality of machining programs, a plurality of first parameters to be adjusted,
and extracting, from the parameters of the plurality of machining programs, a second parameter for each of the plurality of the first parameters, the second parameter being a parameter used to adjust a corresponding one of the plurality of first parameters, the second parameter being fixed and including at least a material property and shape of a material of a workpiece;
generating a data set including the plurality of first parameters and the second parameter, and machine learning a value of one of the plurality of first parameters according to the data set to generate, for each of the plurality of first parameters, a learning model indicating a relationship between the one of the plurality of first parameters and the second parameter; and
providing the value obtained through the machine learning to a machining program generation device that generates a machining program based on the value,
wherein the machining program is used by a numerical control device to control machining of the workpiece, and
the first processor determines a type of the second parameter to be extracted for each type of first parameter, extracts the second parameter of the type determined, and inputs the second parameter to be subjected to the machine learning.

2. The machine learning device according to claim 1, wherein the first processor generates shape data of a finished workpiece based on each of the plurality of machining programs, and extracts the second parameter from the shape data generated.

3. The machine learning device according to claim 1, wherein
the plurality of machining programs are described using a label name indicating a parameter, the first processor extracts a label name indicating the first parameter, and the first processor generates in the machine learning, as a learning result, a learning model using the label name.

4. The machine learning device according to claim 1, wherein the first parameter includes at least one of a machining method, a machining order, a tool type, feed, cutting speed, radial amount of cut, or axial amount of cut.

5. The machine learning device according to claim 1, wherein the machine learning is performed using a neural network.

6. The machine learning device according to claim 5, wherein the neural network is a deep learning multi-layered neural network.

7. The machine learning device according to claim 1, wherein the machine learning is performed using a support vector machine (SVM).

8. The machine learning device according to claim 1, wherein the first processor:
uses the learning model to determine the value of the first parameter.

9. A numerical control device, comprising:
a machine learning device, including:
a processor; and
a memory to store a program which, when executed by the processor, causes the processor to perform a process including:
reading a plurality of machining programs for numerically controlling a machine tool;
extracting, from parameters of the plurality of machining programs, a plurality of first parameters to be adjusted and
extracting, from the parameters of the plurality of machining programs, a second parameter for the plurality of first parameters, the second parameter being a parameter used to adjust corresponding one of the plurality of first parameters, the second parameter being fixed and including at least a material property and shape of a material of a workpiece,
generating a data set including the plurality of first parameters and the second parameter, and machine learning a value of one of the plurality of first parameters according to the data set to generate, for each of the plurality of first parameters, a learning model indicating a relationship between the one of the plurality of first parameters and the first parameter and the second parameter;
reading a machining shape data of another machining program to obtain a present second parameter for inferring a present first parameter,
inferring a present value of the present first parameter from a value of the present second parameter based on the learning model, and
generating a new machining program based on the present value of the present first parameter inferred,
wherein the numerical control device controls machining of the workpiece based on the new machining program, and
the processor determines a type of the second parameter to be extracted for each type of first parameter, extracts the second parameter of the type determined, and inputs the second parameter to be subjected to the machine learning.

10. The numerical control device according to claim 9, wherein
the processor generates the present second parameter from design data including an original workpiece shape and a finished workpiece shape, inputs the present second parameter to be subjected to the inferring, and acquires the present value of the first parameter inferred.

11. The numerical control device according to claim 9, wherein the machining generation device obtains the present second parameter from computer aided design (CAD) data input thereto.

12. The numerical control device according to claim 11, wherein the CAD data includes a shape of a finished article.

13. The numerical control device according to claim 12, wherein the processor is configured to generate input data from the CAD data and to provide the input data to the machine learning device.

14. The numerical control device according to claim 13, wherein the input data includes input data from a plurality of past machining programs.

15. The numerical control device according to claim 13, wherein the input data includes input data for the plurality of first parameters and specifies a type of each of the plurality of first parameters.

16. A machine learning method for a machine learning device, the machine learning method comprising:
reading a plurality of machining programs for numerically controlling a machine tool;
extracting, from parameters of the plurality of machining programs, a plurality of first parameters, and
extracting, from the parameters of the plurality of machining programs, a second parameter for each of the plurality of first parameters, the second parameter being a parameter used to adjust corresponding one of the plurality of first parameters, the second parameter being fixed and including at least a material property and shape of a material of a workpiece;
generating a data set including the plurality of first parameters and the second parameter,
machine learning a value of one of the plurality of first parameters according to the data set to generate, for each of the plurality of first parameters, a learning model indicating a relationship between the one of the plurality of first parameters and the second parameter;
providing at least the value learned through the machine learning to a machining program generation device to generate a machining program using the value learned through the machine learning,
wherein the machining program is used to control machining of the workpiece, and
a type of the second parameter to be extracted is determined for each type of the first parameter, the second parameter of the type determined is extracted, and the second parameter to be subjected to the machine learning is input.

* * * * *